US012559946B2

(12) United States Patent
Stulc et al.

(10) Patent No.: US 12,559,946 B2
(45) Date of Patent: Feb. 24, 2026

(54) DEVICES CONFIGURED TO OPERATE ON AN ANGLED SURFACE, AND ASSOCIATED SYSTEMS AND METHODS

(71) Applicant: Renovate Robotics, Inc., Spokane, WA (US)

(72) Inventors: Andrew Stulc, New York, NY (US); James Schwartz, New York, NY (US); Thomas Forsyth, New York, NY (US); Adam Baumgartner, New York, NY (US)

(73) Assignee: Renovate Robotics, Inc., Spokane, WA (US)

( * ) Notice: Subject to any disclaimer, the term of this patent is extended or adjusted under 35 U.S.C. 154(b) by 0 days.

(21) Appl. No.: 18/935,351

(22) Filed: Nov. 1, 2024

(65) Prior Publication Data

US 2025/0059769 A1     Feb. 20, 2025

Related U.S. Application Data

(62) Division of application No. 18/351,273, filed on Jul. 12, 2023, now Pat. No. 12,158,004.

(Continued)

(51) Int. Cl.
*E04D 15/02* (2006.01)
*E04D 15/06* (2006.01)
(Continued)

(52) U.S. Cl.
CPC ............. *E04D 15/02* (2013.01); *E04D 15/06* (2013.01); *B25J 5/007* (2013.01); *B25J 19/06* (2013.01); *E04D 15/003* (2013.01); *E04D 15/07* (2013.01)

(58) Field of Classification Search
None
See application file for complete search history.

(56) References Cited

U.S. PATENT DOCUMENTS 463,106 A    11/1891  Dees
677,645 A     7/1901  Elkins
(Continued)

FOREIGN PATENT DOCUMENTS

EP      2140754 A1    1/2010
EP      3805478 A1    4/2021
GB      2422141 A     7/2006

OTHER PUBLICATIONS

International Search Report and Written Opinion mailed Nov. 10, 2023 in International Patent Application No. PCT/US23/70056, 11 pages.
(Continued)

*Primary Examiner* — Phi D A
(74) *Attorney, Agent, or Firm* — Perkins Coie LLP

(57) ABSTRACT

Devices configured to operate on an angled surface (e.g., a roof), and associated systems and methods are disclosed herein. In some embodiments, representative systems include an apparatus with a body assembly, an arm assembly coupled to the body assembly, and a material handling assembly coupled to the arm assembly. The body assembly can include a body frame, and a plurality of positioning assemblies coupleable to cables and configured to position and/or orient the body frame on the surface. The arm assembly includes a proximal end portion rotatably coupled to the body portion and a distal end portion opposite the proximal end portion. The material handling assembly is coupled to the distal end portion of the arm assembly and is configured to carry a surface material to be positioned on the angled surface.

22 Claims, 25 Drawing Sheets

Related U.S. Application Data

(60) Provisional application No. 63/388,490, filed on Jul. 12, 2022.

(51) Int. Cl.

| | |
|---|---|
| *B25J 5/00* | (2006.01) |
| *B25J 19/06* | (2006.01) |
| *E04D 15/00* | (2006.01) |
| *E04D 15/07* | (2006.01) |

(56) References Cited

U.S. PATENT DOCUMENTS

| | | | | |
|---|---|---|---|---|
| 2,814,533 | A | * | 11/1957 | Van Horn .................. E04G 3/26 |
| | | | | 182/14 |
| 3,093,936 | A | | 6/1963 | Figge |
| 3,122,862 | A | | 3/1964 | Figge |
| 3,216,369 | A | | 11/1965 | Mckinney |
| 3,298,584 | A | | 1/1967 | Miller |
| 3,542,433 | A | | 11/1970 | Probst |
| 3,769,916 | A | * | 11/1973 | Hogan .................... E04D 15/02 |
| | | | | 52/749.12 |
| 3,794,237 | A | | 2/1974 | Hernandez |
| 3,842,934 | A | | 10/1974 | Bartlett |
| 3,972,462 | A | | 8/1976 | Evans et al. |
| 3,984,040 | A | | 10/1976 | Fry |
| 4,068,446 | A | | 1/1978 | Brueske |
| 4,294,046 | A | | 10/1981 | Damiano |
| 4,421,242 | A | | 12/1983 | Brueske |
| 4,656,808 | A | | 4/1987 | Mansfield |
| 4,785,606 | A | | 11/1988 | Burton |
| 4,880,491 | A | * | 11/1989 | Jacobs .................... E04G 23/02 |
| | | | | 156/763 |
| 4,890,801 | A | | 1/1990 | Brouwer et al. |
| 5,081,815 | A | | 1/1992 | Carnell |
| 5,169,048 | A | | 12/1992 | Himebaugh |
| 5,205,103 | A | * | 4/1993 | Burton .................... E04D 15/02 |
| | | | | 227/111 |
| 5,381,597 | A | | 1/1995 | Petrove |
| 5,749,508 | A | | 5/1998 | Clothier |
| 7,802,854 | B1 | | 9/2010 | Lane et al. |
| 9,945,128 | B1 | | 4/2018 | Baird |
| 10,214,911 | B2 | | 2/2019 | Ragula et al. |
| 10,968,088 | B2 | | 4/2021 | Dorsey et al. |
| 11,131,095 | B2 | | 9/2021 | Beiler et al. |
| 12,158,004 | B2 | | 12/2024 | Stulc et al. |
| 2004/0155087 | A1 | | 8/2004 | Hamlin |
| 2006/0021539 | A1 | | 2/2006 | Eubanks et al. |
| 2007/0164597 | A1 | | 7/2007 | Brown |
| 2017/0204614 | A1 | | 7/2017 | Ragula et al. |
| 2018/0257221 | A1 | | 9/2018 | Toothaker et al. |
| 2019/0032338 | A1 | | 1/2019 | Baird |
| 2020/0024853 | A1 | | 1/2020 | Furrer et al. |
| 2025/0229444 | A1 | | 7/2025 | Stulc et al. |

OTHER PUBLICATIONS

International Search Report and Written Opinion mailed Apr. 24, 2025 in International Patent Application No. PCT/US25/11180, 13 pages.

* cited by examiner

1500

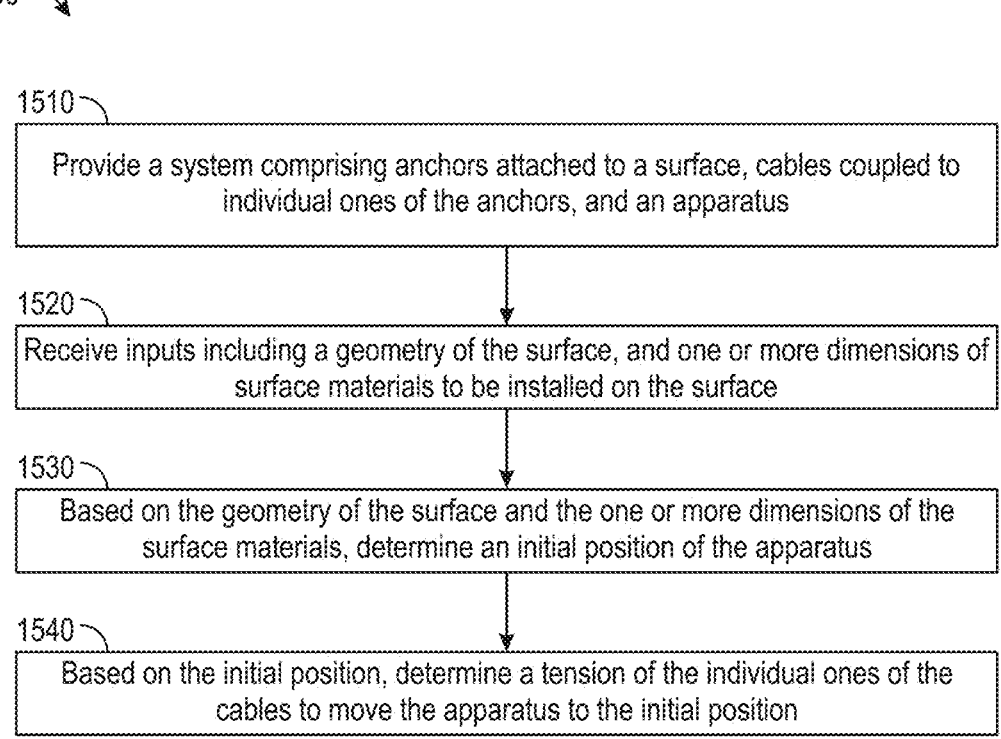

1510

Provide a system comprising anchors attached to a surface, cables coupled to individual ones of the anchors, and an apparatus

1520

Receive inputs including a geometry of the surface, and one or more dimensions of surface materials to be installed on the surface

1530

Based on the geometry of the surface and the one or more dimensions of the surface materials, determine an initial position of the apparatus

1540

Based on the initial position, determine a tension of the individual ones of the cables to move the apparatus to the initial position

DEVICES CONFIGURED TO OPERATE ON AN ANGLED SURFACE, AND ASSOCIATED SYSTEMS AND METHODS

CROSS-REFERENCE TO RELATED APPLICATIONS

The present application is a divisional application of U.S. patent application Ser. No. 18/351,273, filed Jul. 12, 2023, which claims the benefit of U.S. Provisional Patent Application No. 63/388,490, filed Jul. 12, 2022, the disclosures of which are incorporated herein by reference in their entireties.

TECHNICAL FIELD

This present disclosure relates to devices configured to operate on an angled surface, and associated systems and methods. Some embodiments relate to devices configured to operate on a roof or similar structure to perform automated activities such as installing shingles.

BACKGROUND

The number of new buildings constructed has significantly increased over the past few decades. Moreover, the amount of climate-related damage to existing buildings and infrastructure continues to grow, which has increased demand for construction labor. However, construction jobs can be repetitive, low-paying, and dangerous, leading to labor shortages in the industry. Roof installation and maintenance, for example, can be a slow and labor-intensive process, requiring various materials such as shingles to be transported from the ground to the roof and individually installed. There is also increasing demand for installing solar panels on residential and commercial roofs, yet such installations and maintenance remain mostly manual. There is a need to automate the management of roofs and other surfaces of structures.

BRIEF DESCRIPTION OF THE DRAWINGS

Features, aspects, and advantages of the presently disclosed technology may be better understood with regard to the following drawings.

FIG. 15 is a flowchart illustrating a method of operating an apparatus to place surface materials on a surface, configured in accordance with embodiments of the present technology.

Figure 1A:
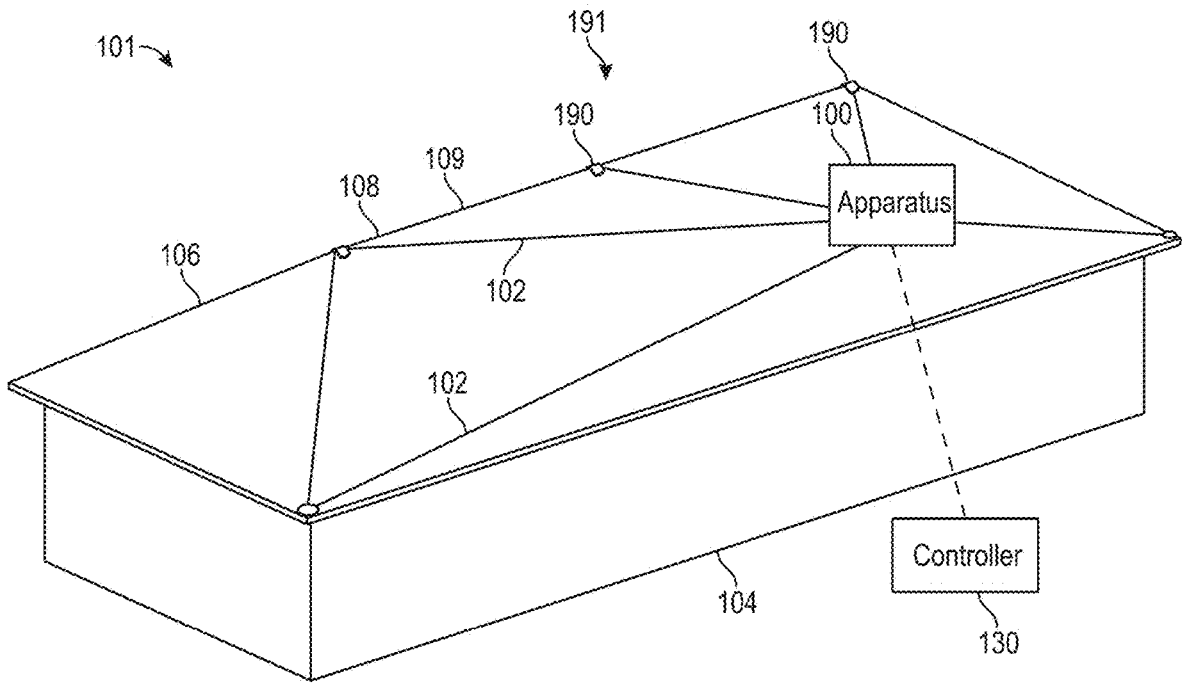
FIG. 1A is a schematic view of a system for operating an apparatus on an angled surface, configured in accordance with embodiments of the present technology.

A person skilled in the relevant art will understand that the features shown in the drawings are for purposes of illustrations, and variations, including different and/or additional features and arrangements thereof, are possible.

DETAILED DESCRIPTION

I. Overview

Embodiments of the present technology relate to devices configured to operate on an angled surface (e.g., roofs, windows walls, and the like), and associated systems and methods. Embodiments of the present technology can be used in a wide range of applications, including, but not limited to, placing and/or removing structures (e.g., shingles or solar panels) on a surface, as well as other tasks (e.g., painting a wall, installing wallpaper, cleaning windows, etc.). Conventional methods of carrying out the aforementioned tasks are mostly manual, which can be repetitive, low-paying, and dangerous. As a result, there are labor shortages for a wide variety of construction tasks notwithstanding the demand.

Embodiments of the present technology address at least some of the above-described issues. For example, embodiments of the present technology include an apparatus configured to operate on an angled surface relative to a direction of gravity. The apparatus can comprise a body assembly including a body frame and a plurality of positioning assemblies coupled to the body frame, wherein the positioning assemblies are configured to position and/or orient the body frame on the surface, an arm assembly including a proximal end portion and a distal end portion opposite the proximal end portion, wherein the arm assembly is rotatably coupled to the body portion, and a material handling assembly coupled to the distal end portion of the arm assembly, wherein the material handling assembly is configured to carry a surface material.

Additionally or alternatively, embodiments of the present technology can include a system for operating a device on an angled surface. The system can comprise an apparatus (e.g., a surface management apparatus) configured to operate over an angled surface and carry a surface material, wherein the angled surface includes an x-axis, a y-axis normal to the x-axis, and a z-axis normal to an x-y plane defined by the x-axis and the y-axis. The apparatus can comprise a body frame and a plurality of positioning assemblies at peripheral portions of the body frame, wherein individual ones of the positioning assemblies include a tensioner device. The system can also comprise an anchoring system comprising a plurality of anchors attached at peripheral portions of the surface, and a plurality of cables, wherein the cables are coupleable to and configured to extend between one of the anchors and one of the positioning assemblies of the apparatus. The system can further comprise a controller operably coupled to the tensioner devices, and that adjusts the tensioner devices to control a tension of the cables. In doing so, the controller can position the apparatus along the x-y plane and orient the apparatus about the z axis.

Embodiments of the present technology also include a method of operating an apparatus to place surface materials on a surface. The method can comprise providing a system that includes anchors attached to a surface, cables coupled to individual ones of the anchors, and the apparatus including positioning assemblies coupled to individual ones of the cables. The method can also comprise receiving inputs including (i) a geometry of the surface and (ii) one or more dimensions of surface materials to be installed on the surface. The method can further comprise (i) determining an initial position of the apparatus based on the geometry of the surface and the one or more dimensions of the surface materials, and (ii) determining a tension of the individual ones of the cables to move the apparatus to the initial position based on the initial position.

Embodiments of the present technology provide several advantages and improvements over existing solutions. For example, embodiments of the present technology can include a high level of automation, significantly reducing the manual labor needed, as well as reducing installation defect rates and operational expenditures associated with manual labor.

In the Figures, identical or similar reference numbers identify generally similar, and/or identical, elements. Many of the details, dimensions, and other features shown in the Figures are merely illustrative of particular embodiments of the disclosed technology. Accordingly, other embodiments can have other details, dimensions, and features without departing from the spirit or scope of the disclosure. In addition, those of ordinary skill in the art will appreciate that further embodiments of the various disclosed technologies can be practiced without several of the details described below.

II. Systems for Operating an Apparatus on an Angled Surface

FIG. 1A is a schematic view of a system 101 for operating a device, cart, or apparatus 100 ("apparatus 100") on an angled surface 108, configured in accordance with embodiments of the present technology. As explained herein, the angled surface 108 can be configured to have structures or surface materials (e.g., shingles) attached thereto by the apparatus 100. The system 101 can include the apparatus 100 and an anchoring system 191, and can be disposed on top of or otherwise proximate to a roof 106 of a building 104. The building 104 can be a residential building such as a house or an apartment, a commercial building such as an office building or a hotel, etc. The roof 106 can include one or more angled or inclined roof surfaces joined together at various angles, with the angled surface 108 being one such surface. In the illustrated embodiment, the shape of the angled surface 108 is a trapezoid. In other embodiments, the shape of the angled surface 108 can be a rectangle, a triangle, a parallelogram, or any other shape (e.g., a non-rectangular shape). The angled surface 108 can be oriented at any angle, such as vertical (i.e., parallel to a direction of gravity), horizontal (i.e., perpendicular to the vertical), at least 1 degree, 5 degrees, 10 degrees, 20 degrees, 30 degrees, 40 degrees, 50 degrees, 60 degrees, 70 degrees, 80 degrees, or 89 degrees from the direction of gravity, between 5-45 degrees, or between 1-89 degrees from the direction of gravity. In some embodiments, the angled surface 108 can include an overhanging surface. As explained elsewhere herein, surface materials can include subsurface materials (i.e., materials to be applied underneath other materials on a surface, such as structural support) and materials to be applied to an underside of a surface (e.g., a ceiling).

In the illustrated embodiment, the anchoring system 191 includes a plurality of anchors 190 mounted on or attached to the angled surface 108. The anchors 190 can be secured manually to the roof 106 and/or angled surface 108 in a fixed position. The number of anchors 190 can be 3, 4, 5, 6, or more. As explained elsewhere herein, the number of anchors can be determined based on the degrees of freedom of the angled surface onto which the structures are being attached. For example, the number of anchors can be one more than the number of degrees of freedom.

The arrangement of the anchors 190 can also vary. For example, the anchors 190 can be positioned and secured to a periphery 109 or peripheral portions of the angled surface 108, as shown. For example, the anchors 190 can be positioned at or proximate to corners and/or edges of the angled surface 108. Additionally or alternatively, anchors 190 can be positioned away from the periphery 109 and towards the center of the angled surface 108. In some embodiments, the anchors 190 can be positioned and secured to multiple surfaces (e.g., two or more surfaces) of the roof 106, and/or to surfaces and/or structures other than the angled surface 108, such as the other surfaces of the roof 106 and/or the building 104 in the illustrated embodiment.

The anchoring system 191 can also include a plurality of cables 102 connected between individual ones of the anchors 190 and the apparatus 100. The cables 102 can comprise stainless steel and/or be configured to withstand a maximum tension (e.g., 38 kilonewtons). In some embodiments, the lengths and/or tension of the cables 102 can be individually controlled (e.g., via mechanisms of the apparatus 100 and instructions from the controller 130). As described elsewhere herein, the apparatus 100 can be positioned, oriented, and/or transported across the angled surface 108 via the anchored system 191 and/or components of the apparatus 100, e.g., by controlling the length and/or tension of the individual cables 102. In some embodiments, the cables 102 can be attached to existing structures on or proximate to the angled surface 108 instead of or in addition to the anchors 190. In some embodiments, the tension in each of the cables 102 can be maintained at or below a maximum operating tension (e.g., 2 kilonewtons) during operation on the angled surface 108.

The system 101 can further include a controller 130 in communication with the apparatus 100, via a wired connection and/or wirelessly, and used to control movement and/or operation of the apparatus 100 over the angled surface 108. The controller 130 can allow operators to control aspects of the apparatus 100 and/or the overall system 101 from a remote location. The controller 130 can also be programmed to control the apparatus 100 in a partially or fully autonomous manner. Many embodiments of the controller 130 and/or technology described below may take the form of computer-executable instructions, including routines executed by a programmable computer. The controller 130 may, for example, include a combination of supervisory control and data acquisition (SCADA) systems, distributed control systems (DCS), programmable logic controllers (PLC), control devices, and processors configured to process computer-executable instructions. Those skilled in the relevant art will appreciate that the technology can be practiced on computer systems other than those described herein. The technology can be embodied in a special-purpose computer or data processor that is specifically programmed, configured or constructed to perform one or more of the computer-executable instructions described below. Accordingly, the terms "controller" and "computer" as generally used herein refer to any data processor. Information handled by these computers can be presented at any suitable display medium. The controller 130 can be included and/or operably coupled to any of the systems, devices, or apparatuses described herein, even if not shown or described with reference to a particular figure.

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of particular embodiments of the disclosed technology.

Figure 1B:
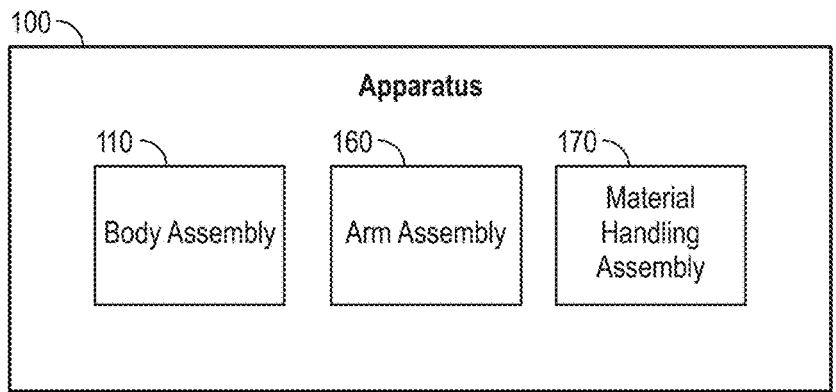
FIG. 1B is a schematic of the apparatus of FIG. 1A.

FIG. 1B is a schematic of the apparatus 100, configured in accordance with embodiments of the present technology. As shown, the apparatus 100 can include a body assembly 110, an arm assembly 160 coupled to the body assembly 110, and a material handling assembly 170 (e.g., an applicator) coupled to the arm assembly 160. The material handling assembly 170 can be attached to the body assembly 110 directly or via the arm assembly 160. The apparatus 100 can include fewer and/or additional assemblies. The term "assembly" as generally used herein can include a single component or a group of multiple components.

Referring to FIGS. 1A and 1B together, in operation, the anchoring system 191 and/or components of the apparatus 100 can be used to position and/or orient the body assembly 110 on the angled surface 108. As the apparatus 100 moves, the material handling assembly 170 can place and/or apply one or more surface materials on, under, or proximate to the angled surface 108. For example, the surface materials can include roof shingles, the angled surface 108 can be a roof, and the apparatus 100 can remove and/or install the shingles on the roof during operation. In another example, the surface materials can include solar panels and the apparatus 100 can remove and/or install solar panels on the roof during operation. In another example, the surface materials can include underlayment and the apparatus 100 can install the underlayment underneath other materials on the surface. In another example, the surface materials can include brackets that hold down solar panels and/or shingles, and the apparatus 100 can install the brackets underneath, on the sides of, and/or over such solar panels and/or shingles. In yet another example, the surface materials can include cleaning products, the angled surface 108 can be a window, and the apparatus 100 can clean the window during operation.

As described herein, the anchoring system 191 can allow the apparatus 100 to be positioned and/or oriented on the angled surface 108 as needed during operation. Furthermore, by including the material handling assembly 170 distinct from the body assembly 110, the apparatus 100 can place and/or apply the surface materials at edges of the angled surface 108 without having the center of mass of the apparatus (e.g., within the body frame) at the edges of the angled surface 108, thus reducing the risk of the apparatus 100 falling over.

During operation, the position and/or orientation of the body assembly 110 and of the material handling assembly 170 can further be arranged to optimize certain parameters, such as optimizing (e.g., reducing) tension in the cables 102, and/or optimizing (e.g., minimizing) travel distance of the apparatus 100 across the angled surface 108. The arm assembly 160 can include components that allow multiple degrees of freedom to facilitate movement of the material handling assembly 170 relative to the body assembly 110.

Figure 2:
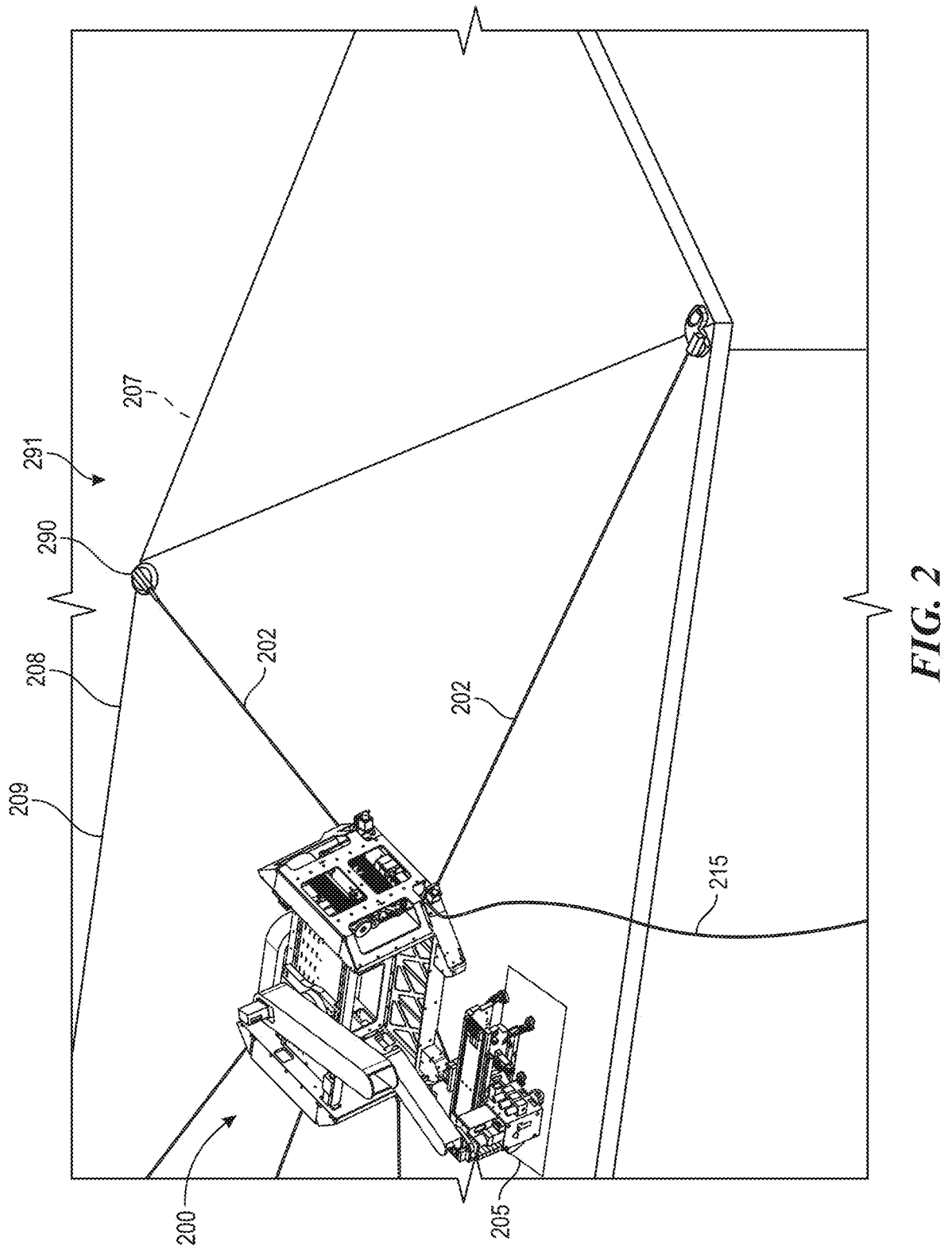
FIG. 2 is an enlarged perspective view of a system for operating an apparatus on an angled surface, configured in accordance with embodiments of the present technology.

FIG. 2 is an enlarged perspective view of a system 201 (e.g., the system 101 in FIG. 1A) for operating an apparatus 200 (e.g., the apparatus 100) on an angled surface 208 (e.g., the angled surface 108), configured in accordance with embodiments of the present technology. The system 201 can include the apparatus 200 and an anchoring system 291, which includes a plurality of cables 202 (e.g., the cables 102) and a plurality of anchors 290 (e.g., the plurality of anchors 190) mounted on or attached to a periphery 209 of the angled surface 208. In the illustrated embodiment, each anchor 290 is mounted to both the angled surface 208 and an adjacent surface 207 (obscured from view in FIG. 2). As described herein in further detail (e.g., with respect to FIGS. 9A and 9B), attaching to more than one surface allows individual ones of the anchors 290 to be more secure and provide better positioning and orienting of the apparatus 200. In other embodiments, the anchors 290 can be secured at other positions on the angled surface 208. The system 201 can further include one or more utility cords 215 attached to one or more components of the apparatus 200. The utility cord 215 can supply power (e.g., electricity), compressed air, network connection, etc. from the ground while and/or before the apparatus 200 operates on the angled surface 208.

During operation, the position and/or orientation of the apparatus 200 can be controlled, such as by individually controlling the lengths and tension of the cables 202. The apparatus 200 can be used to place and/or apply a surface material 205 (e.g., a roof shingle or any of the surface materials described with respect to FIGS. 1A and 1B) on the angled surface 208. As described herein, the apparatus 200 can carry multiple surface materials 205 and place the surface materials 205 (e.g., one by one) in a predetermined and/or optimized layout while the apparatus 200 moves across the angled surface 208. In some embodiments, the surface material 205 can comprise a rectangle with a length of at least 5 inches, 10 inches, 20 inches, 30 inches, 40 inches, or within a range of 5-40 inches and a width of at least 5 inches, 10 inches, 20 inches, 30 inches, 40 inches, or within a range of 5-40 inches.

Figure 3:
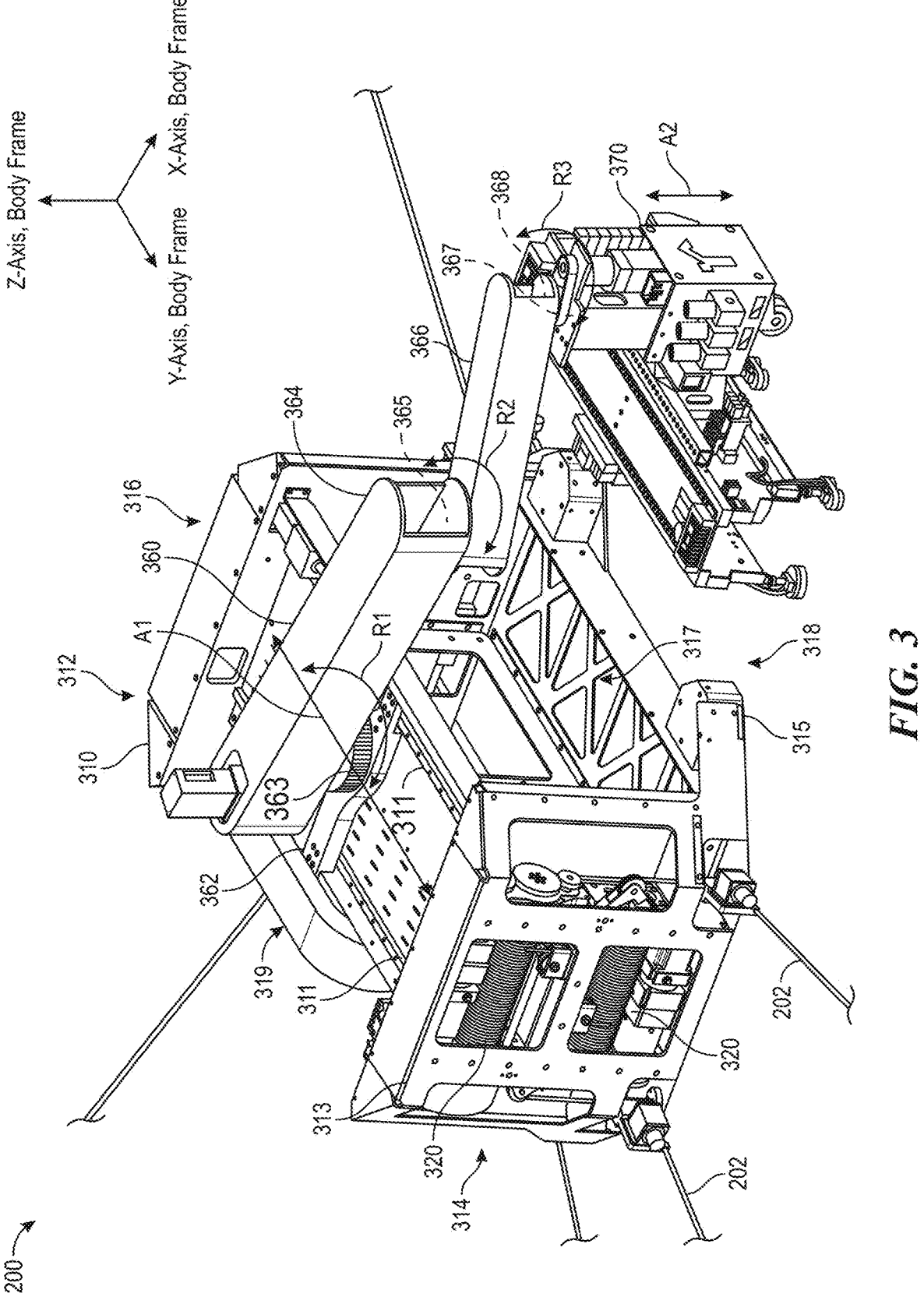
FIG. 3 is a perspective view of the apparatus of FIG. 2.

FIG. 3 is a perspective view of the apparatus 200. The apparatus 200 can include a body assembly 310 (e.g., the body assembly 110 of FIG. 1B), an arm assembly 360 (e.g., the arm assembly 160), and a material handling assembly 370 (e.g., the material handling assembly 170). In the illustrated embodiment, the body assembly 310 is attached to five different cables 202. In other embodiments, the body assembly 310 can be attached to fewer (e.g., three, four) or more (e.g., six, seven) cables 202.

The body assembly 310 includes a body frame 313, which can be a rigid structure comprising metal (e.g., aluminum, steel), plastic, or a combination thereof. The body frame 313 can include a z-axis (e.g., a first body frame axis) extending along a vertical dimension, an x-axis (e.g., a second body frame axis) extending along a length dimension of the body frame 313 and normal to the z-axis, and a y-axis (e.g., a third body frame axis) extending along a width dimension of the body frame 313 and normal to the x-axis. In the illustrated embodiment, the body frame 313 includes a top portion 312, a first side portion 314, a second side portion 316 opposite the first side portion 314, a third side portion 318 generally extending between the first and second side portions 314 and 316, and a fourth side portion 319 opposite the third side portion 318. The body assembly 310 also includes a plurality of positioning assemblies 320 (e.g., tensioner devices or assemblies) coupled to the body frame 313. Two such positioning assemblies 320 on the first side portion 314 of the body frame 313 are shown in FIG. 3. The body frame 313 can partially cover (as shown) or fully cover the positioning assemblies 320 to provide protection. Details of each positioning assembly 320 is described herein (e.g., with respect to FIG. 4).

The body assembly 310 can further include one or more actuators 311 (e.g., rails) at or coupled to the top portion 312 of the body frame 313, a sliding portion 362 coupled to and moveable by the actuators 311, and a bearing 363 coupled to the sliding portion 362 for engaging the arm assembly 360. The body assembly 310 can include a plurality of wheels 315 coupled to the body frame 313, and allowing the body assembly 310 to move across a surface (e.g., the angled surface 208 in FIG. 2). The body assembly 310 can also include one or more hoppers 317 for receiving, storing, and/or releasing (when needed) materials. The hoppers 317 can include a first hopper configured to receive surface materials (e.g., the surface material 205), and a second hopper configured to receive fixation supplies (e.g., nails, screws, adhesives) for fixing the surface materials to the surface. The body assembly 310 can also include wiring for supplying power (e.g. from the utility cord 215 in FIG. 2) to the positioning assemblies 320, the actuators 311, the bearing 363 (which can be motorized), and the arm assembly 360.

The arm assembly 360 can be attached to an upper portion of the body assembly 310, such that the arm assembly 360 can rotate partially or fully (e.g., 360 degrees) around the body frame 313. The arm assembly 360 can include a proximal end portion coupled to the body assembly 310 (e.g., to the body frame 313) and a distal end portion opposite the proximal end portion. The distal end portion can be coupled to the material handling assembly 370. As shown in FIG. 3, the arm assembly 360 can include a first arm portion 364, and a second arm portion 366 coupled to the first arm portion 364. A first end of the first arm portion 364 is rotatably coupled to the sliding portion 362 via the bearing 363 of the body assembly 310. A first end of the second arm portion 366 is rotatably coupled to a second end of the first arm portion 364, e.g., via a bearing 365. The bearing 367 and/or actuator 368 (e.g., a linear actuator) is attached to a second end of the second arm portion 366, can be coupled to the material handling assembly 370. The arm assembly 360 can also include wiring for supplying power from the body assembly 310 to the bearings 365, 367 (which can be motorized), the actuator 368, and the material handling assembly 370. In some embodiments, the arm assembly 360 omits the second arm portion 366 and only includes the first arm portion 364.

During operation of the apparatus 200, the actuators 311 can be controlled (e.g., via the controller 130 in FIG. 1A) to move the sliding portion 362 (and thus the arm assembly 360) along axis A1. The bearing 363 can be controlled to rotate the first arm portion 364 along rotation direction R1 relative to the sliding portion 362. The bearing 365 can be controlled to rotate the second arm portion 366 along rotational direction R2 relative to the first arm portion 364. Each of the bearing 367 and the actuator 368 can be controlled to move the material handling assembly 370 along axis A2 and rotational direction R3 relative to the second arm portion 366. In doing so, embodiments of the present technology allow the material handling assembly 370 to be moved relative to the body assembly 310 with five degrees of freedom (i.e., A1, R1, R2, R3, and A2). Having multiple degrees of freedom enables the material handling assembly 370 to be positioned and oriented with more control and precision relative to the body assembly 310. During operation, for example, the material handling assembly 370 can place a surface material in a variety of positions and orientations around the body assembly 310 while the body assembly 310 remains fixed in position relative to the surface, reducing the required amount of movement for the body assembly 310, which may be the heaviest and bulkiest assembly in some embodiments. The material handling assembly 370 can also place and/or apply surface materials at the edges of the surface while the body assembly 310 stays away from the edges, thus reducing risk of the apparatus 200 falling off the surface.

Figure 4:
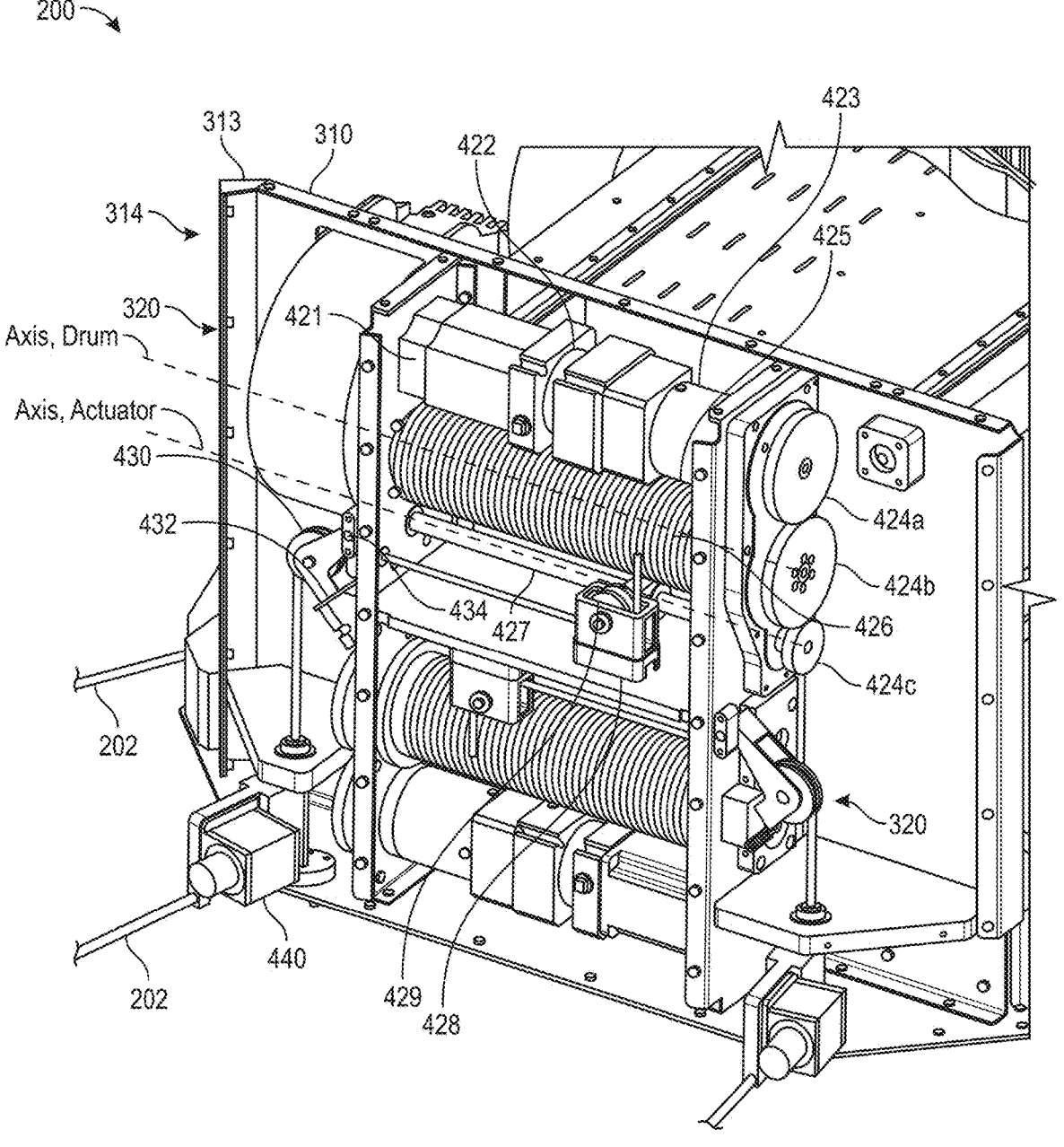
FIG. 4 is an enlarged perspective view of a first side of the apparatus of FIG. 2.

FIG. 4 is an enlarged perspective view of the first side portion 314 of the body assembly 310. A portion of the body frame 313 is rendered partially transparent to show important features of the technology. In the illustrated embodiment, two positioning assemblies 320 are shown attached to the body frame 313 on the first side portion 314. Each positioning assembly 320 can include a motor 421 (e.g., a servo motor) attached to the body frame 313, a motor brake 422 coupled to the motor 421, and a reduction gearbox 423 coupled to the motor brake 422, e.g., via gears. The gears can include a first gear 424a coupled to the reduction gearbox 423, a second gear coupled to and configured to be actuated by the first gear 424a, and a third gear 424c coupled to and configured to be actuated by the second gear 424b.

The body assembly 310 can include a cable drum 425 disposed along a drum axis ("axis, drum") substantially oriented horizontally, an actuator 427 (e.g., a lead screw) disposed along an actuator axis and operably coupled to the cable drum 425, and a drum tensioner or drum winder 428 ("drum winder 428") coupled to the actuator 427. In some embodiments, the drum axis and the actuator axis are parallel to one another. The cable drum 425 can be coupled to the second gear 424b, and can include a spiraling groove 426 for receiving one of the cables 202. The third gear 424c can be attached to the actuator 427. The drum winder 428 can include a pulley 429 for engaging the cable 202, which can extend from the pulley 429 to another pulley 430. The pulley 430 can be attached to the body frame 313 via hinge 434 and disposed proximate to a force-measuring sensor 432 (e.g., a load cell, a force transducer). The cable 202 can extend further to a pivot assembly 440, which will be described herein in further detail (e.g., with respect to FIG. 6). The cable 202 can continue to extend from the pivot assembly 440 to an anchor (e.g., the anchor 290 in FIG. 2) mounted on the surface (e.g., the angled surface 208).

During operation of the apparatus 200, the motor 421 can be controlled (e.g., via the controller 130 in FIG. 1A) to rotate the first and second gears 424a and 424b based on a desired tension, and at desired rotation rates and/or angles. Rotation of the second gear 424b rotates the cable drum 425 about the drum axis, which winds or unwinds the cable 202 onto or from the spiraling groove 426. Rotation of the second gear 424b rotates the third gear 424c, which actuates the actuator 427. The actuator 427 moves the drum winder 428 along a linear axis parallel to the actuator axis. The drum winder 428 can ensure that the cable 202 remains in the spiraling groove 426 during rotation of the cable drum 425, reducing the risk of the cable 202 tangling or causing an uneven rate of winding or unwinding. The gear ratio between gears 424b and 424c can be configured such that the actuator 427 moves the drum winder 428 at the same or similar rate as the portion of the cable 202 being wound onto or unwound from the spiraling groove 426.

Winding or unwinding a particular cable 202 via a corresponding motor 421 changes the length of the portion of the cable 202 extending between the body assembly 310 and a corresponding anchor (e.g., the anchor 190) attached to the surface. Therefore, the motor 421 can be controlled to shorten the cable 202 to position the body assembly 310 closer to the corresponding anchor, or lengthen the cable 202 to position the body assembly 310 farther from the corresponding anchor.

As tension in the cable 202 changes during operation of the apparatus 200, the cable 202 can push against the pulley 430, and because the pulley 430 is only attached to the body frame 313 via the hinge 434, the pulley 430 can then push against the force-measuring sensor 432. The force-measuring sensor 432 can be used to calculate real-time tension in the cable 202, which can then be used to control movement of the apparatus 200 (FIG. 3) and/or body assembly 310, as will be described elsewhere herein.

Figure 5:
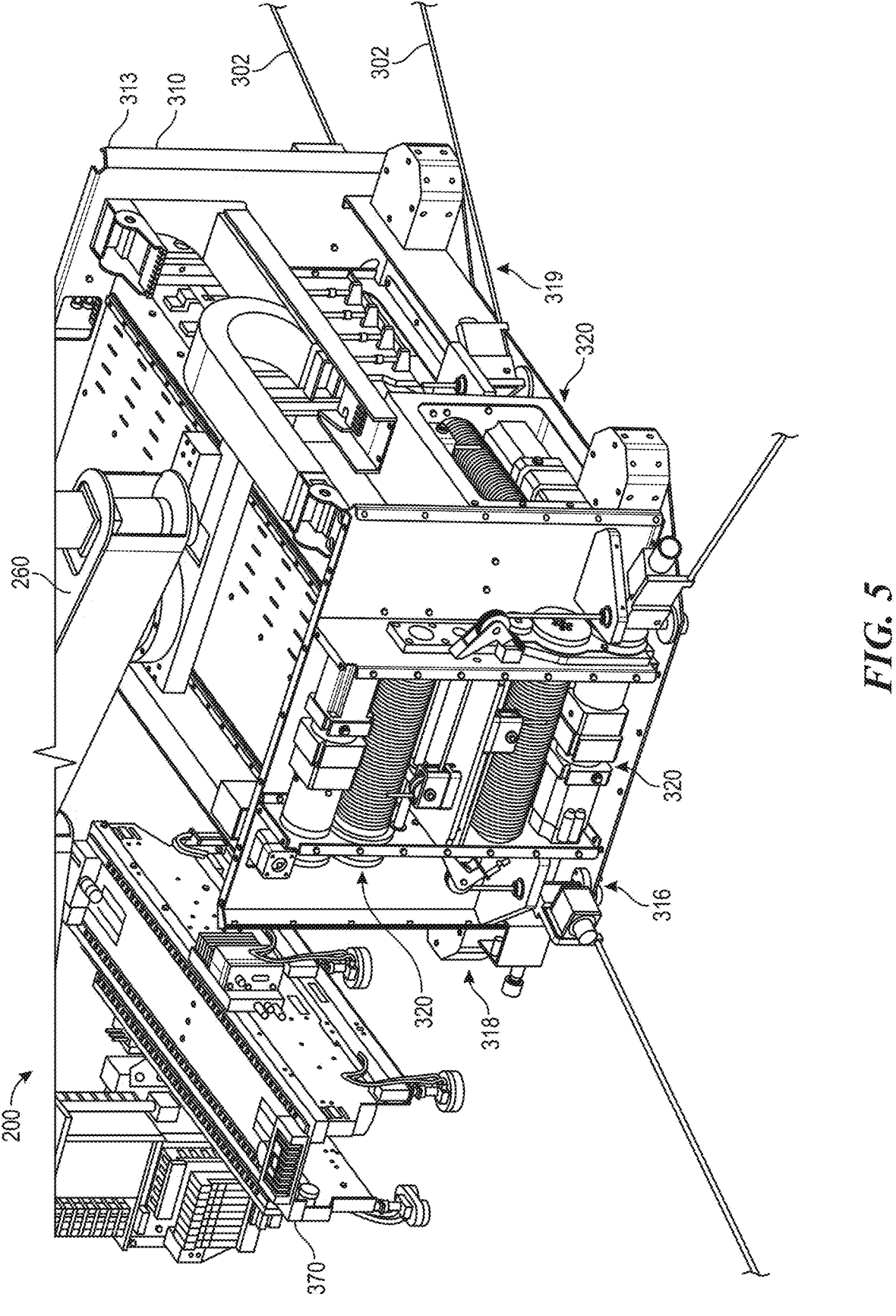
FIG. 5 is an enlarged perspective view of a second side of the apparatus of FIG. 2.

FIG. 5 is an enlarged perspective view facing the third and fourth side portions 318, 319 of the body assembly 310. A portion of the body frame 313 is rendered partially transparent to show important features of the technology. In the illustrated embodiment, two positioning assemblies 320 are shown attached to the body frame 313 on the third side portion 318 and another positioning assembly 320 is shown attached to the body frame 313 on the fourth side portion 319. In total, the illustrated embodiment includes five positioning assemblies 320 (two shown in FIG. 4 and three shown in FIG. 5), which are arranged such that the five cables 202 attached to corresponding ones of the five positioning assemblies 320 extend from different portions of the body assembly 310. In the illustrated embodiment, for example, the body frame 313 has a generally prismatic shape, four of the five cables 202 extend from each of the four lower corners of the body frame 313, and the fifth cable 202 extends from the fourth side portion 319, as shown. In some embodiments, the body assembly 310 can have a generally cylindrical shape, a spherical shape, a pyramid shape, or any other three-dimensional shape.

During operation, as discussed above with respect to FIG. 4, each positioning assembly 320 can be independently controlled to change the length of the cable 202 extending between the body assembly 310 and a corresponding anchor. The positioning assemblies 320 can also be controlled to orient (i.e., rotate) the body assembly 310. By controlling the lengths and/or tension of the cables 202 independently, the apparatus 200 can be positioned and/or oriented as desired on the surface. In some embodiments, the positioning assemblies 320 can rotate the body frame 313 across a range of at least 10 degrees, 20 degrees, 30 degrees, 60 degrees, 120 degrees, 180 degrees, or between 10-180 degrees.

Figure 6:
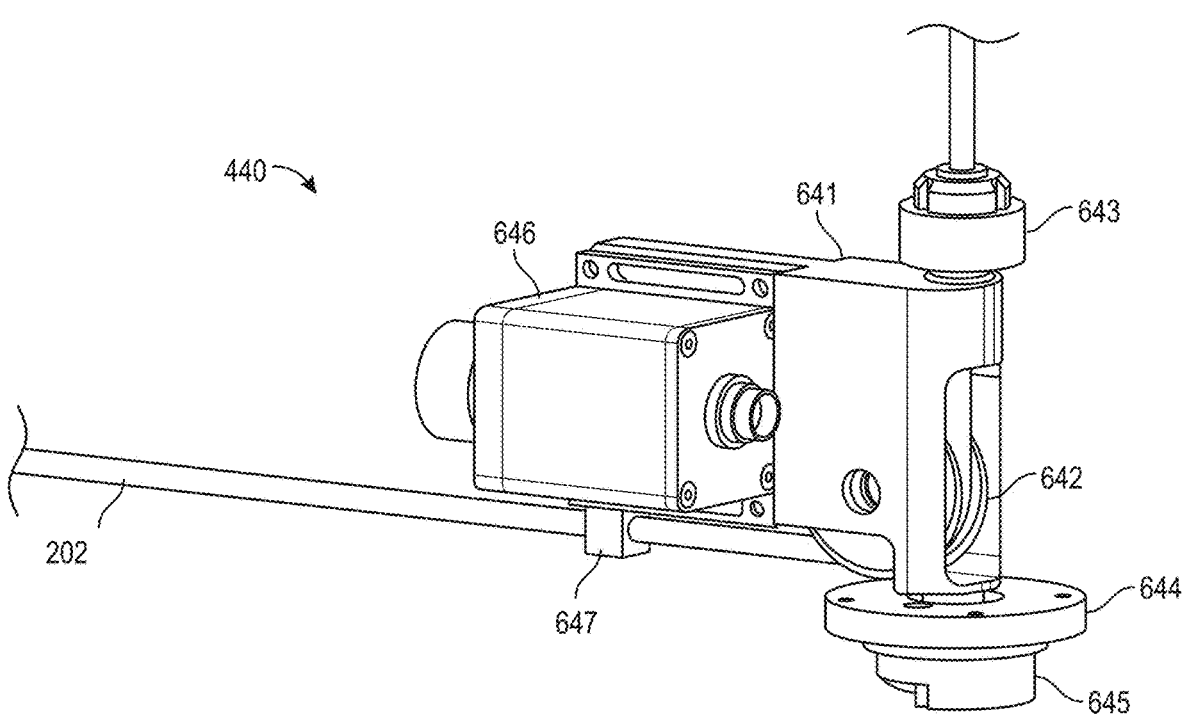
FIG. 6 is an enlarged perspective view of a cable pivot assembly of the apparatus of FIG. 2.

FIG. 6 is an enlarged perspective view of the cable pivot assembly 440 that can be included in individual ones of the positioning assemblies 320. The cable pivot assembly 440 can include a frame structure 641, a pulley 642 rotatably mounted to the frame structure 641, a first bearing 643 (e.g., an angular contact bearing) mounted to the frame structure 641, a second bearing 644 mounted to the frame structure 641, a sensor or encoder 645 ("encoder 645") mounted to the second bearing 644, a distance sensor 646 (e.g., a laser distance sensor), and a cable guide 647 mounted to the distance sensor 646 and/or the frame structure 641. The cable 202 can extend from the pulley 430 (FIG. 4) through the first bearing 643, around the pulley 642, and through the cable guide 647 toward an anchor (e.g., the anchor 290 in FIG. 2). The second bearing 644 can be attached to the body frame 313 (FIG. 3) such that the pivot assembly 440 can rotate about a pivot axis defined by the portion of the cable 202 extending through the first bearing 643.

During operation, as the cable length is changed (e.g., via the motor 421), the distance sensor 646 can obtain (e.g., measure or calculate) the distance to the anchor to which the cable 202 extends. The cable guide 647 can ensure that the distance sensor 646 faces toward the anchor, as long as there is sufficient tension in the cable 202. Furthermore, as discussed herein, the different positioning assembles 320 can be independently controlled to rotate the body assembly 310 relative to the angled surface. Because the anchors remain fixed in position and the second bearing 644 allows the pivot assembly 440 to freely rotate relative to the body frame 313, the encoder 645 can obtain any angular changes of the second bearing 644, and thus any angular changes of the cable 202 relative to the body assembly 310. As described elsewhere herein, the measurements obtained by the distance sensor 646 and the encoder 645 can be used as inputs for controlling the apparatus 200.

Figure 7:
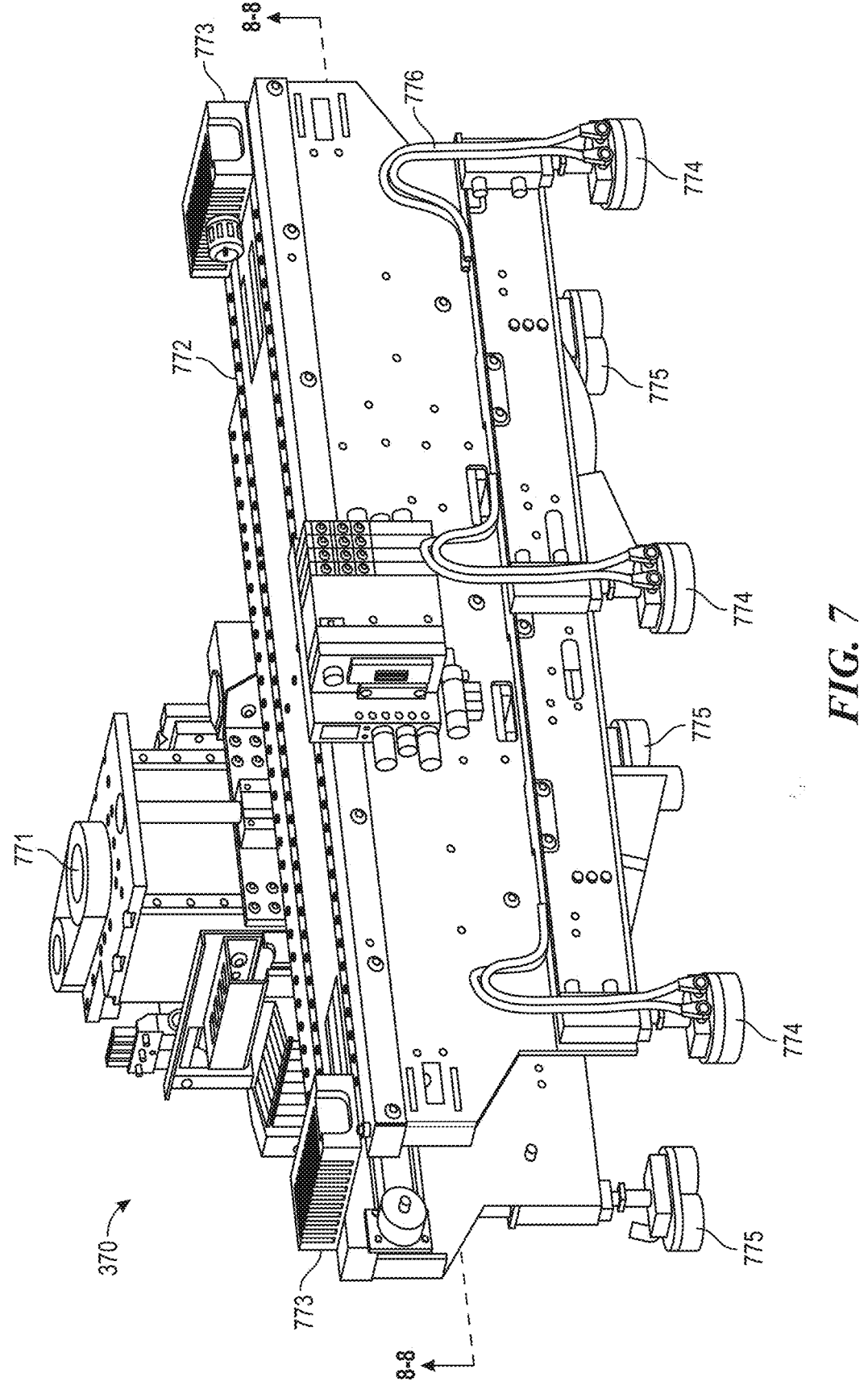
FIG. 7 is a perspective view of a material handling assembly of the apparatus of FIG. 2.
Figure 8:
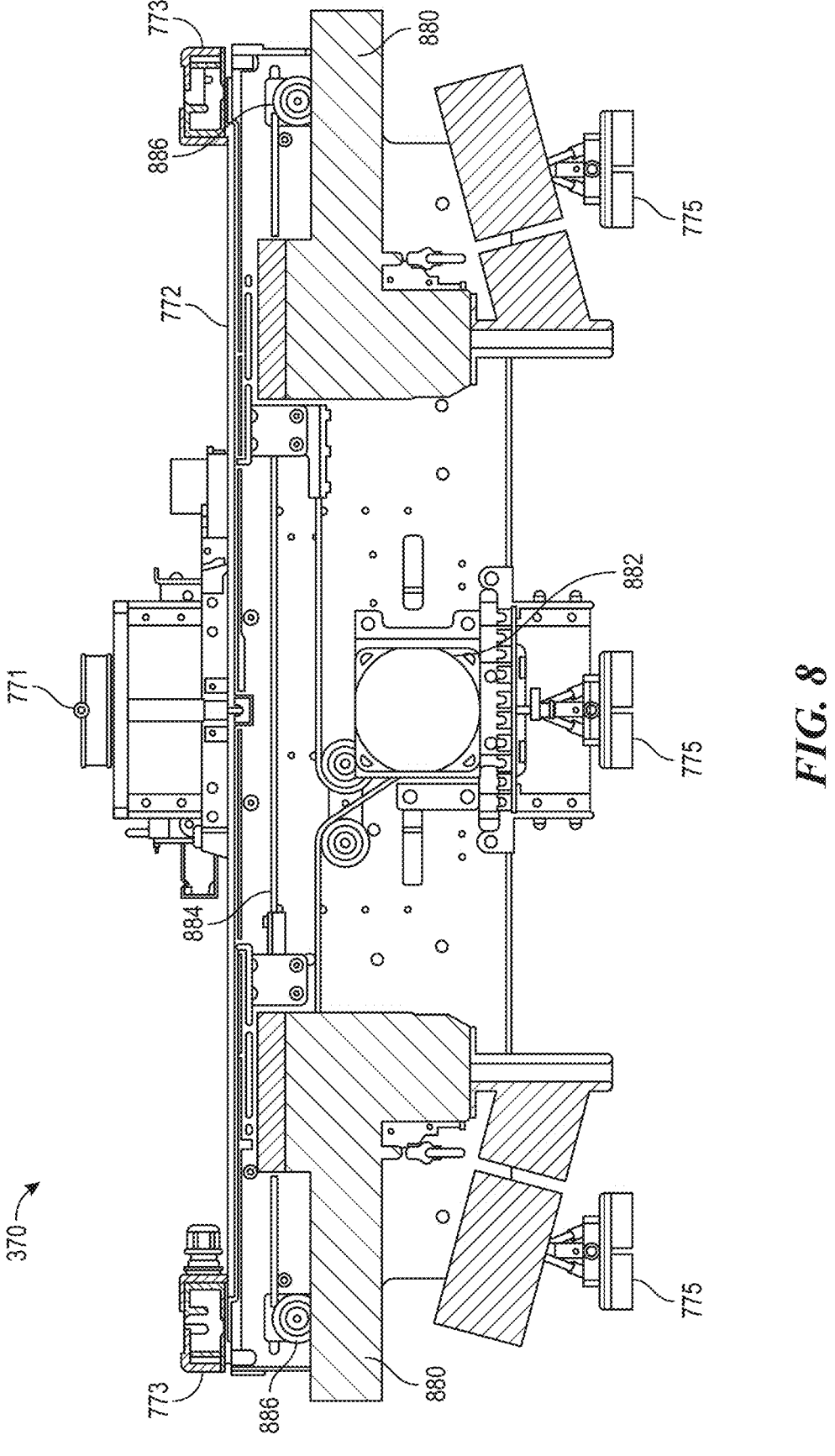
FIG. 8 is a sectional view of the material handling assembly of FIG. 7 along line 8-8, configured in accordance with embodiments of the present technology.

FIG. 7 is a perspective view of the material handling assembly 370, and FIG. 8 is a sectional view of the material handling assembly 370 along line 8-8 of FIG. 7. Referring to FIGS. 7 and 8 together, the material handling assembly 370 can include a frame structure 772, a connection member 771 attached to the frame structure 772, one or more sensors 773 (e.g., cameras, machine vision cameras, or lasers) mounted on or at the frame structure 772, a plurality of handling members 774, 775 attached to the frame structure 772, and wiring 776 coupled to the handling members 774, 775. In some embodiments, the sensors 773 can be attached to an upper portion of the frame structure 772 and arranged to face downward (e.g., toward the angled surface). In some embodiments, the handling members 774, 775 can be attached to a lower portion of the frame structure 772 such that the handling members 774, 775 are disposed proximate to the surface. In the illustrated embodiment, the handling members 774, 775 comprise suction cups. Individual ones of a first set of the handling members 774 can comprise a single suction cup, while individual ones of a second set of the handling members 775 can comprise two suction cups arranged side-by-side, as shown.

The material handling assembly 370 can further include one or more fixation devices 880 (e.g., nail guns, adhesive applicators) (FIG. 8), a fixation device motor 882, and pulleys 886 attached to the frame structure 772. A belt 884 can wrap around the pulleys 886 and operably couple the fixation device motor 882 to the fixation devices 880.

During operation, the arm assembly 360 can be controlled to move the material handling assembly 370 between a first location, such as proximate to the hopper 317 (FIG. 3) to retrieve surface materials and/or fixation supplies (e.g., nails, screws, adhesives), and a second location, such as a position on the surface to place the surface materials. The handling members 774, 775 can be toggled between an on state, in which the handling members 774, 775 attach to, seal, and/or lift a surface material (e.g., when proximate to the hopper 317), and an off state, in which the handling members 774, 775 unseal and/or release the surface material (e.g., when at a desired position on the surface. The wiring 776 can supply power (e.g., electricity) and/or control signals to individual ones of the handling members 774, 775. In some embodiments, the handling members 774, 775 comprise suction cups and the dual suction cups structure of the second set of the handling members 775 can provide back-up functionality when, for example, one of the suction cups lands on an edge of the surface material and cannot reliably lift the surface material.

The sensors 773 can obtain the position of the surface material placed by the handling members 774, 775, such as by detecting an edge of the surface and/or displacement from another adjacent surface material that has already been placed on the surface. In doing so, the body assembly 310 can be used to move the apparatus 200 to a general desired area, thus serving as a "coarse" adjustment, and the arm assembly 360 and/or material handle assembly 370 can be used to place the surface material at a specific position of the angled surface, thus serving as a "fine" adjustment. Once the sensors 773 or other sensors confirm that the surface material is positioned at a desired spot on the surface, the fixation device motor 882 can be controlled (e.g., via the controller 130) to actuate the fixation devices 880 and fix the surface material to the surface. For example, the fixation devices 880 can comprise nail guns and the fixation device motor

882 can move the belt 884 to continuously activate the nail guns to nail the surface material to the surface.

Figure 9A:
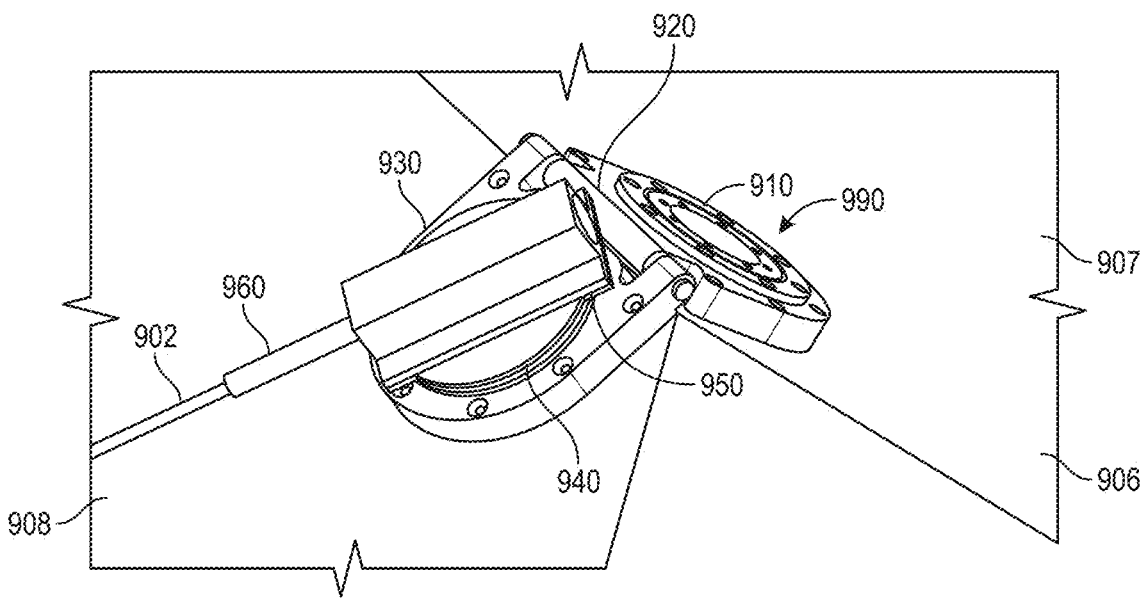
FIGS. 9A and 9B are perspective and sectional views, respectively, of an anchor, configured in accordance with embodiments of the present technology.
Figure 9B:
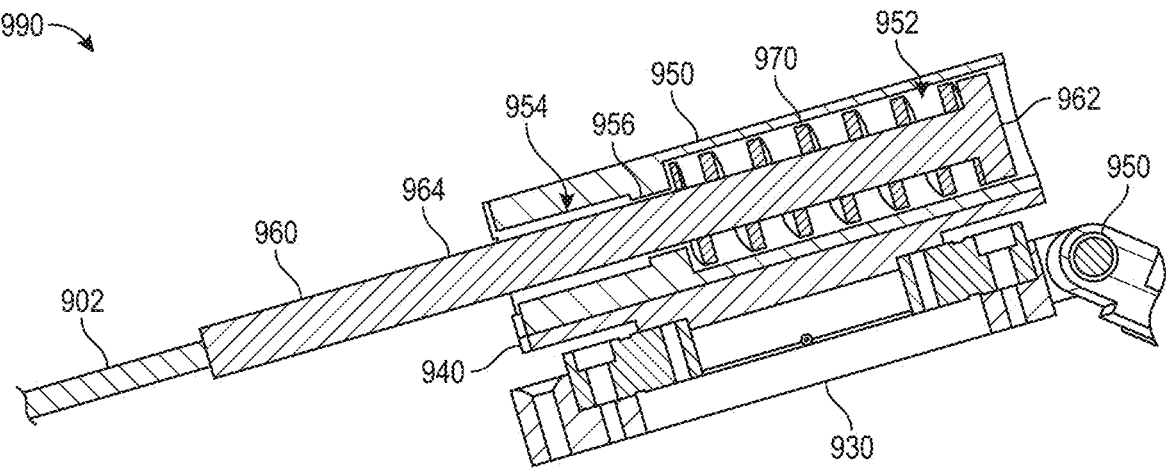

FIGS. 9A and 9B are perspective and sectional views, respectively, of an anchor 990 (e.g., the anchor 290 in FIG. 2), configured in accordance with embodiments of the present technology. Referring to FIGS. 9A and 9B together, the anchor 990 can comprise a first anchor member 910 (FIG. 9A), a second anchor member 930, an anchor hinge 920 pivotably coupling the first and second anchor members 910, 930, a bearing 940 (e.g., a cross-roller bearing) attached to the second anchor member 930, a bushing 950 attached to the bearing 940 such that the bushing 950 is rotatably coupled to the second anchor member 930, a rod member 960 disposed at least partially inside the bushing 950, and a biasing member 970 (e.g., a compression spring) also disposed at least partially inside the bushing 950. The bushing 950 can include a first cavity 952 and a second cavity 954 (FIG. 9B) interconnected but separated by a ring portion 956 (FIG. 9B). The biasing member 970 can be disposed in the first cavity 952. The rod member 960 can be disposed in both the first and second cavities 952, 954. The rod member 960 can include a flat end portion 962 configured to contact the biasing member 970. In some embodiments, the anchor 990 can also include a reflector plate (e.g., the reflector plate 981 discussed herein with respect to FIGS. 9C and 9D). The reflector plate can be attached to the bushing 951 or another component of the anchor 990.

Prior to operation of an apparatus (e.g., the apparatus 200) on an angled surface 908 (e.g., the angled surface 208), the anchor 990 can be installed, e.g., on a roof or other structure. The second anchor member 930 can be attached to the angled surface 908 (e.g., via fasteners) while the first anchor member 910 can be attached to an adjacent surface 907 (e.g., the adjacent surface 207) of the roof 906. The anchor hinge 920 allows the first and second anchor members 910, 930 to be attached to two different surfaces that are angled to each other. The rod member 960 can be attached to a distal end of a cable 902 (e.g., the cable 202) via, for example, cable splicing and pins. In some embodiments, the first anchor member 910 is omitted and the anchor 990 is attached only to a single surface.

During operation of the apparatus, the apparatus can move and/or rotate relative to the angled surface 908. The bearing 940 allows the rod member 960 attached to the cable 902 to rotate on the plane of the angled surface 908. Rotation of the rod member 960 allows the apparatus to be positioned and/or oriented on the angled surface 908 without bending the cable 902. The biasing member 970 allows the rod member 960, and thus the distal end of the cable 902, to remain relatively fixed in position relative to the anchor 990 while also allowing for some movement as needed. The slack provided by the biasing member 970 can beneficially reduce tension in the cable 902 and reduce the load on components of the apparatus, thereby reducing risk of mechanical failure.

Figure 9C:
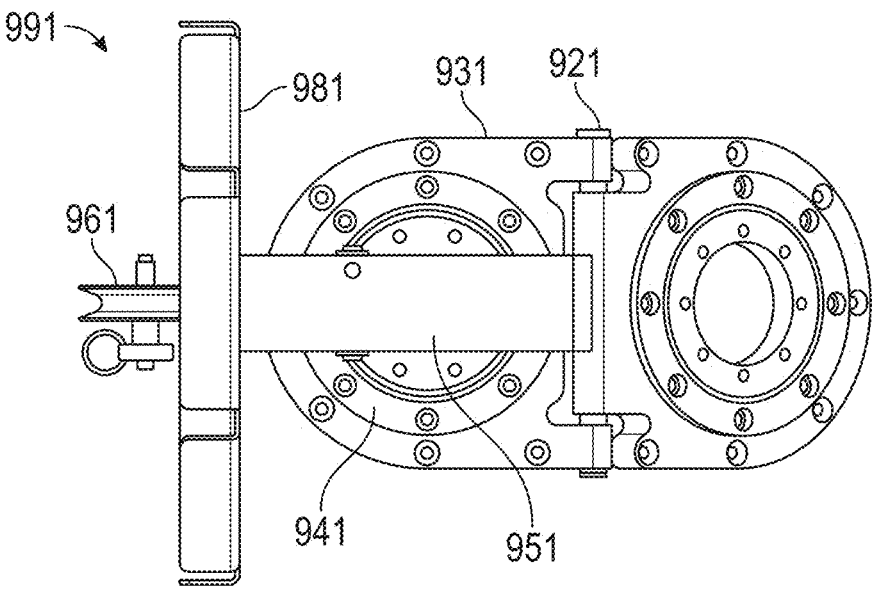
FIGS. 9C and 9D are perspective and sectional views, respectively, of an anchor, configured in accordance with embodiments of the present technology.
Figure 9D:
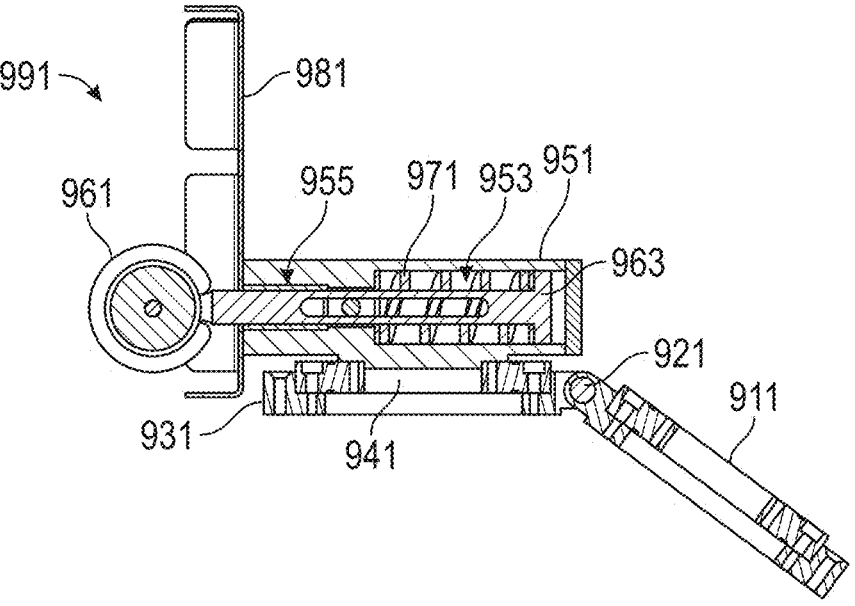

FIGS. 9C and 9D are perspective and sectional views, respectively, of an anchor 991 (e.g., the anchor 290 in FIG. 2 or the anchor 990 in FIGS. 9A and 9B), configured in accordance with embodiments of the present technology. Referring to FIGS. 9C and 9D together, the anchor 991 can comprise a first anchor member 911, a second anchor member 931, an anchor hinge 921 pivotably coupling the first and second anchor members 911, 931, a bearing 941 (e.g., a cross-roller bearing) attached to the second anchor member 931, a bushing 951 attached to the bearing 941 such that the bushing 951 is rotatably coupled to the second anchor member 931, a pulley mount 963 (FIG. 9D) disposed at least partially inside the bushing 950, a pulley 961 attached to the pulley mount 963, a biasing member 971 (e.g., a compression spring) also disposed at least partially inside the bushing 951, and a reflector plate 981 attached to the bushing 951. The bushing 951 can include a first cavity 953, and a second cavity 955 (FIG. 9D) interconnected to the first cavity 953. The biasing member 971 can be disposed in the first cavity 953. The pulley mount 963 can be disposed in both the first and second cavities 953, 955. The pulley mount 963 can include an end portion (e.g., a flat end portion) configured to contact and/or be operably coupled to the biasing member 971.

Prior to operation of embodiments (e.g., the apparatus 200) of the present technology on an angled surface 908 (e.g., the angled surface 208), the anchor 991 can be installed, e.g., on a roof or other structure. The second anchor member 931 can be attached to the angled surface 908 (e.g., via fasteners) while the first anchor member 911 can be attached to an adjacent surface 907 (e.g., the adjacent surface 207) of the roof 906. The anchor hinge 921 allows the first and second anchor members 911, 931 to be attached to two different surfaces that are angled to each other. A cable (e.g., the cable 202) can loop around or otherwise couple to the pulley 961. In some embodiments, the first anchor member 911 is omitted and the anchor 991 is attached only to a single surface.

During operation of the apparatus, the apparatus can move and/or rotate relative to the angled surface 908. The bearing 941 allows the bushing 951 and the pulley 961, and hence the corresponding cable (e.g., the cable 902), to rotate on the plane of the angled surface 908. Rotation of the pulley 961 allows the apparatus to be positioned and/or oriented on the angled surface 908 without bending the cable and while keeping the cable on the pulley 961. The biasing member 971 allows the pulley mount 963, and thus the distal end of the cable, to remain relatively fixed in position relative to the anchor 991 while also allowing for some movement as needed. The slack provided by the biasing member 971 can beneficially reduce tension in the cable and reduce the load on components of the apparatus, thereby reducing risk of mechanical failure. The reflector plate 981 can reflect a laser, a wave, or similar signal emitted from a distance sensor (e.g., the distance sensor 646) configured to measure the distance to the anchor 991.

With reference to FIGS. 9A-9D together, in some embodiments anchors 990, 991 can further include positioning assemblies, such as the positioning assemblies 320 (FIG. 3). The positioning assemblies on the anchors 990, 991 can be independently controlled to change the length and/or tension of each of the cables. In systems comprising anchors that include positioning assemblies, the apparatus (e.g., the apparatus 200) may not include positioning assemblies. In embodiments where positioning assemblies are included only in the anchors, the apparatus can be more lightweight. In embodiments where positioning assemblies are included only in the apparatus, power, control, and/or communication need only be directed to the apparatus, and the anchors can remain purely mechanical.

Figure 10:
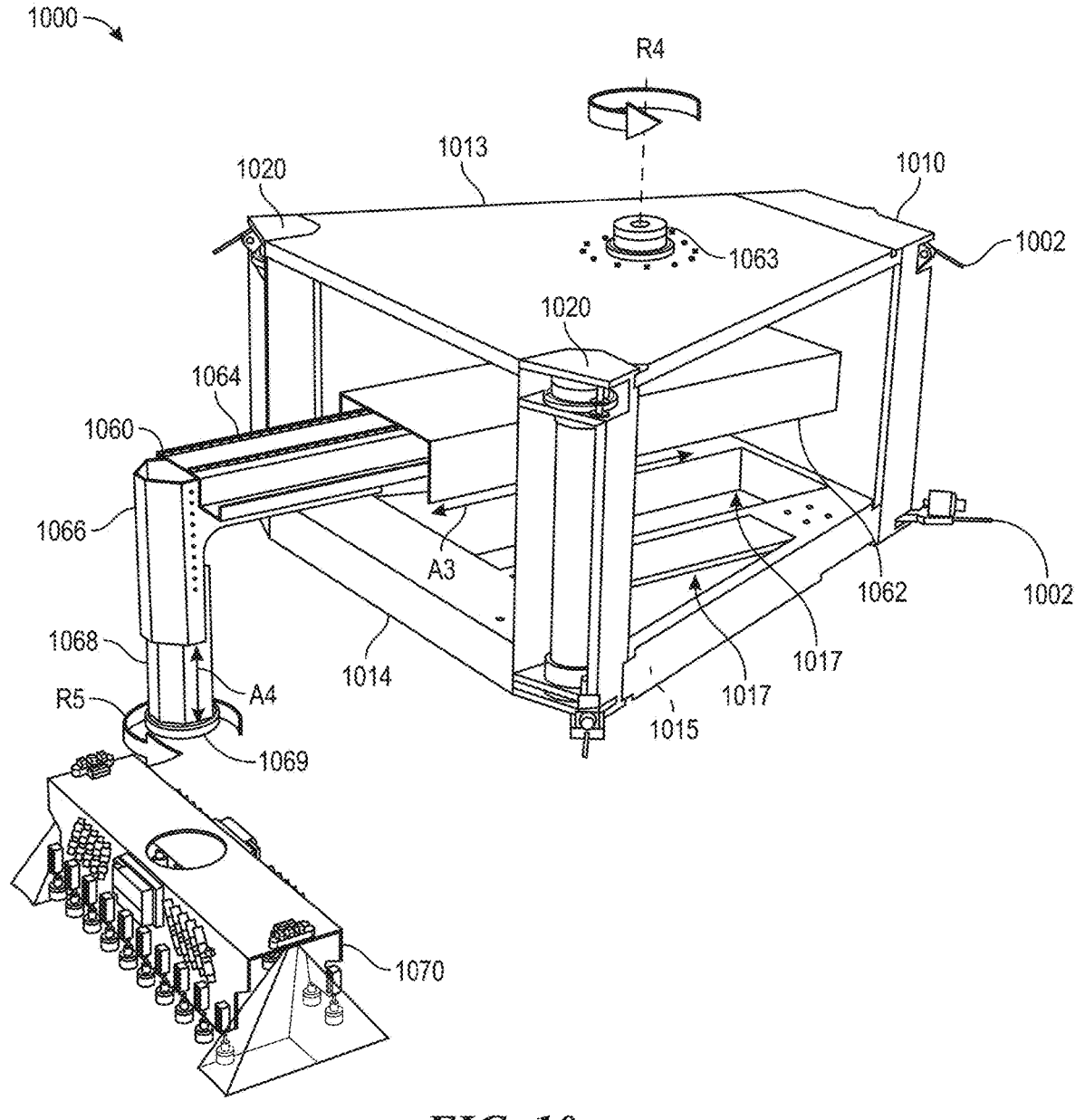
FIG. 10 is a perspective view an apparatus configured to operate on an angled surface, configured in accordance with embodiments of the present technology.

FIG. 10 is a perspective view another apparatus 1000 configured to operate on an angled surface (e.g., the angled surface 108), configured in accordance with embodiments of the present technology. The apparatus 1000 can include a body assembly 1010 (e.g., the body assembly 110 of FIG. 1B), an arm assembly 1060 (e.g., the arm assembly 160), and a material handling assembly 1070 (e.g., the material handling assembly 170). The body assembly 1010 is attached to a plurality of cables 1002 (e.g., the cables 102).

As shown in the illustrated embodiments, the cables can be attached to both an upper portion and a lower portion of the body assembly 1010.

The body assembly 1010 includes a body frame 1013, which can be a rigid structure comprising metal (e.g., aluminum or steel), plastic, or a combination thereof. The body assembly 1010 also includes a plurality of positioning assemblies 1020 attached to the body frame 1013 and extending generally vertically between the upper and lower portions of the body frame 1013. The body frame 1013 can partially cover (as shown) or fully cover the positioning assemblies 1020, e.g., to provide protection. The body assembly 1010 can further include a bearing 1063 attached to the body frame 1013 and the arm assembly 1060 (and operably coupled to an actuator or motor), a plurality of wheels 1015 coupled to the body frame 1013, and one or more hoppers 1017 for receiving, storing, and/or releasing (when needed) one or more surface materials (e.g., the surface material 205) and/or fixation supplies (e.g., nails, screws, adhesives). The individual positioning assemblies 1020 can be controlled to change lengths of or tension in the cables 1002 in order to position and/or orient the body assembly 1010 relative to the surface.

The arm assembly 1060 can include a proximal end portion coupled to the body assembly 1010 (e.g., to the body frame 1013) and a distal end portion opposite the proximal end portion. The distal end portion can be coupled to the material handling assembly 1070. The arm assembly 1060 includes a first arm portion 1062 attached to the bearing 1063 of the body assembly 1010 and extending generally horizontally, a second arm portion 1064 slidably attached to the first arm portion 1062 (e.g., via an actuator, a telescoping mechanism) and extending generally horizontally, a third arm portion 1066 attached to the second arm portion 1064 and extending generally vertically, and a fourth arm portion 1068 slidably attached to the third arm portion 1066 (e.g., via an actuator) and extending generally vertically. The first arm portion 1062 is rotatable about an axis extending through the body frame 1013, the second arm portion 1064 is extendable independent of the other arm portions, and the fourth arm portion 1068 is extendable and rotatable independent of the other arm portions. The arm assembly 1060 can further include a bearing 1069 coupled to the fourth arm portion 1068 and operably coupled to an actuator or motor. The bearing 1069 can be coupled to the material handling assembly 1070. The arm assembly 1060 can also include wiring for supplying power from the body assembly 1010 to the material handling assembly 1070.

In some embodiments, the arm assembly 1060 can have different configurations and provide the same or more degrees of freedom. For example, the arm assembly 1060 can include three rotary joints (e.g., Selective Compliance Assembly Robot Arm (SCARA)), components that allow movement along two linear axes and rotation around another axis, or components that allow movement along and/or rotation about multiple axes. In some embodiments, the arm assembly 1060 can include additional or alternative components that allow higher degrees of freedom.

During operation of the apparatus 1000, the bearing 1063 can be controlled to rotate the first arm portion 1062 along rotational direction R4 relative to the body frame 1013. The second arm portion 1064 can be moved (e.g., by controlling an actuator) along axis A3 relative to the first arm portion 1062. For example, the first arm portion 1062 can comprise a housing from or into which the second arm portion 1064 can be extended or retracted. The fourth arm portion 1068 can be moved (e.g., by controlling an actuator) along axis A4 relative to the third arm portion 1066. The bearing 1069 can be controlled to rotate the material handling assembly 1070 along rotational direction R5 relative to the fourth arm portion 1068. As such, embodiments of the present technology allow the material handling assembly 1070 to be moved relative to the body assembly 1010 with multiple degrees of freedom (e.g., four degrees of freedom R4, A3, A4, and R5). Having multiple degrees of freedom enables the material handling assembly 1070 to be positioned and oriented with more control and precision relative to the body assembly 1010. During operation, for example, the material handling assembly 1070 can place a surface material in a variety of positions and orientations around the body assembly 1010 while the body assembly 1010 remains fixed in position relative to the surface. This reduces the required amount of movement for the body assembly 1010, which can require significant energy to move. The material handling assembly 1070 can also place and/or apply surface materials at the edges of the surface while the body assembly 1010 stays away from the edges, thus reducing risk of the apparatus 1000 falling off the surface.

Figure 11:
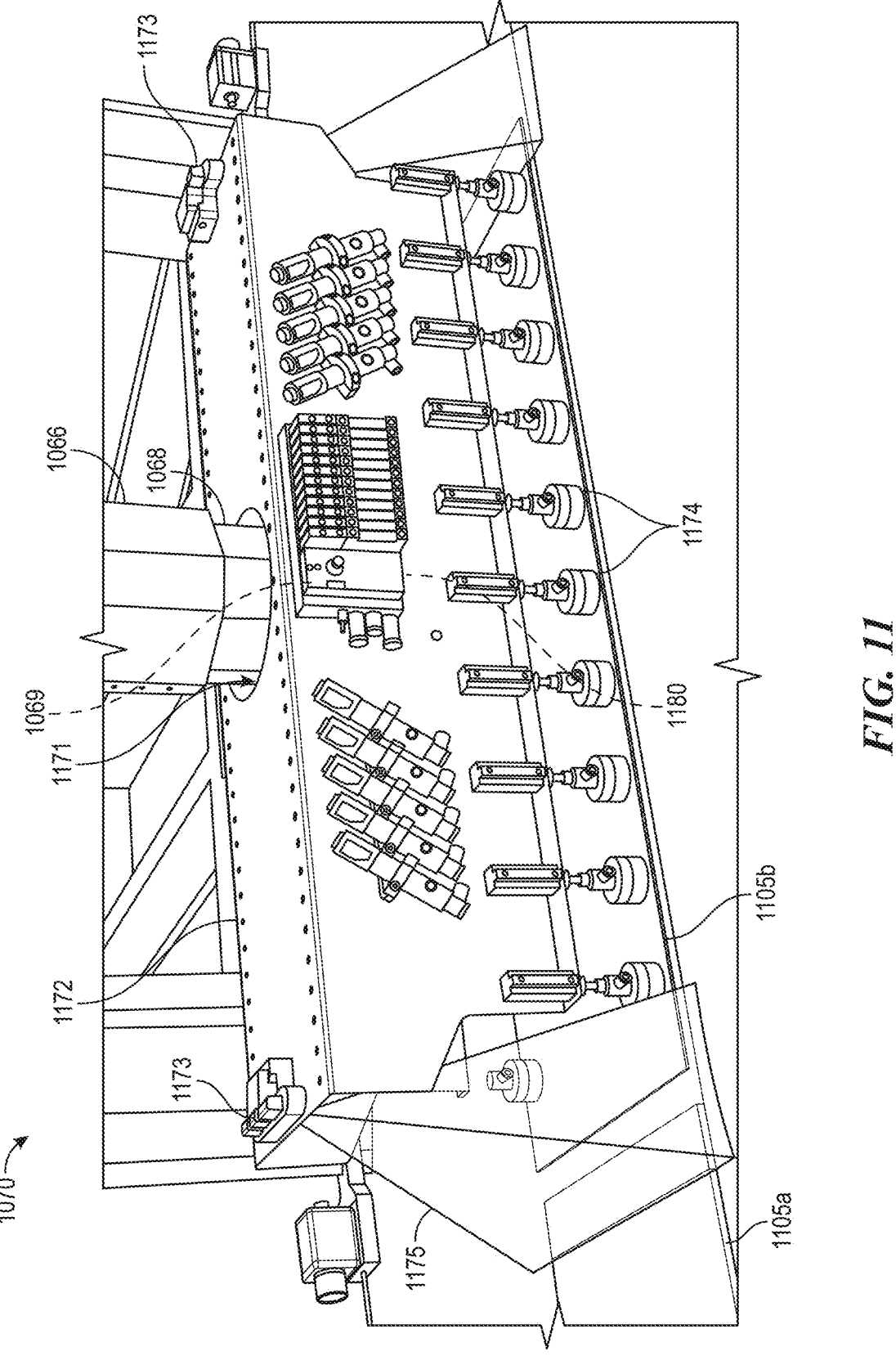
FIG. 11 is a perspective view of a material handling assembly of the apparatus of FIG. 10.

FIG. 11 is a perspective view of the material handling assembly 1070, configured in accordance with embodiments of the present technology. The material handling assembly 1070 can include a frame structure 1172 including an aperture 1171 for receiving and connecting to the arm assembly 1060 (e.g., via the second bearing 1069). The material handling assembly 1070 can also include one or more sensors 1173 (e.g., cameras, machine vision cameras, or lasers) and a plurality of handling members 1174 attached to the frame structure 1172. In some embodiments, the sensors 1173 can be attached to an upper portion of the frame structure 1172 and arranged to face downward (e.g., toward the surface). In some embodiments, the handling members 1174 can be attached to a lower portion of the frame structure 1172 such that the handling members 1174 are disposed proximate to the surface. In the illustrated embodiment, the handling members 1174 comprise suction cups. The material handling assembly 1070 can further include one or more fixation devices 1180 (e.g., nail guns, adhesive applicators) (obscured from view in FIG. 11, but similar to the fixation devices 880 shown in FIG. 8) attached to the frame structure 1172.

During operation, the arm assembly 1060 can be controlled to move the material handling assembly 1070 between various locations, such as toward the hopper 1017 (FIG. 10) to retrieve surface materials and/or fixation supplies, and toward various positions on the surface to place the surface materials. The handling members 1174 can be toggled between an on state, in which the handling members 1174 attach to, seal, and/or lift a surface material (e.g., at the hopper 1017), and an off state, in which the handling members 1174 unseal and/or release the surface material (e.g., at a desired position on the surface. After a first surface material 1105*a* (e.g., the surface material 205 in FIG. 2) is placed on the surface, the sensors 1173 can keep track of the position of a second surface material 1105*b* being placed by the handling members 1174, such as by detecting edges of the first and second surface materials 1105*a*, 1105*b* within a field of vision 1175 of the sensor 1173. In some cases, it may be desirable to place the second surface material 1105*b* (i) over a portion of the first surface material 1105*a* and create overlap, (ii) side-by-side (e.g., abutting) the first surface material 1105*a*, or (iii) spaced apart from the first surface material 1105*a* (as shown). The sensors 1173 can also detect edges of the surface within the field of vision 1175, e.g., to avoid placing the surface materials over the edges of the surface. However, in some cases, it may be desirable to place the surface materials over the edges to, for example, increase the effective surface area of a roof and/or improve the aesthetic appearance of the roof. In some embodiments, the body assembly 1010 can be used to move the apparatus 1000 to a general desired area, thus serving as a "coarse" adjustment, and the arm assembly 1060 and/or material handle assembly 1070 can be used to place the surface material at a specific position of the angled surface, thus serving as a "fine" adjustment. Once sensors 1173 or other sensors confirm that the surface material is positioned at a desired spot on the surface, the fixation devices 1180 can be actuated to attach the surface material to the surface. The fixation devices 1180 can comprise nail guns, adhesive applicators, etc.

Figure 12:
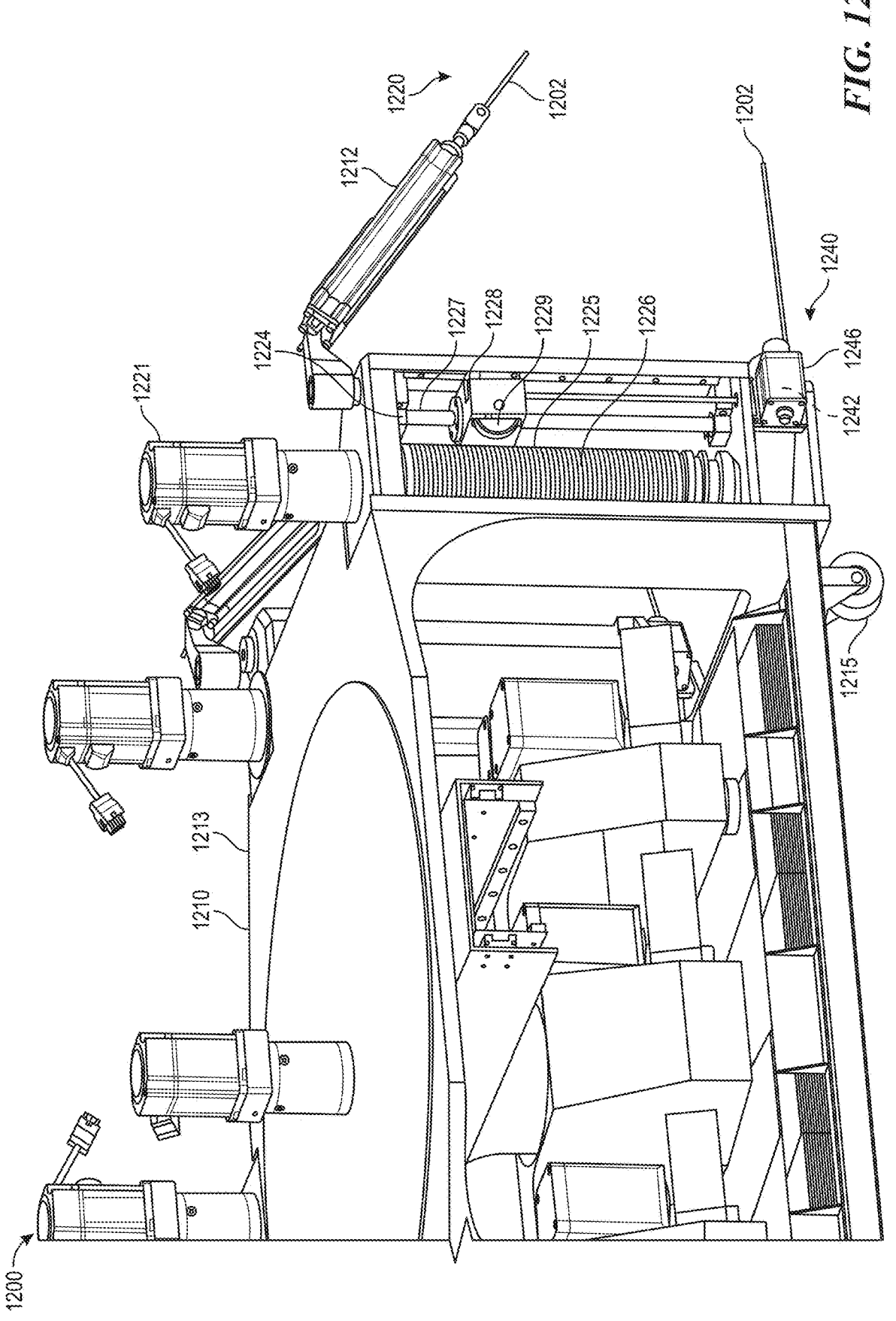
FIG. 12 is an enlarged perspective view of an apparatus configured to operate on an angled surface, configured in accordance with embodiments of the present technology.

FIG. 12 is an enlarged perspective view of yet another apparatus 1200 configured to operate on an angled surface, configured in accordance with embodiments of the present technology. The apparatus 1200 can include a body assembly 1210, which can include a body frame 1213, wheels 1215 attached to the body frame 1213, and a plurality of positioning assemblies 1220 attached to the body frame 1213, one of which is shown in detail in FIG. 12. The positioning assemblies 1220 may be an example of the positioning assembly 1020 described herein with respect to FIG. 10.

Each positioning assembly 1220 can include a motor 1221 coupled to the body frame 1213, a cable drum 1225 oriented generally vertically and operably coupled to the motor 1221, an actuator 1227 (e.g., a lead screw), a gearbox 1224 operably coupling the motor 1221 to the cable drum 1225 and/or the actuator 1227, and a drum tensioner or drum winder 1228 ("drum winder 1228") coupled to the actuator 1227. Each positioning assembly 1220 can also include a pivot assembly 1240 and a cable gripper 1212, each attached to the body frame 1213.

The cable drum 1225 includes a spiraling groove 1226 for receiving one of a plurality of cables 1202 (e.g., cables 102 in FIG. 1A). The drum winder 1228 can include a pulley 1229 for engaging the cable 1202 extending from the cable drum 1225. The cable can extend from the pulley 1229 to another pulley 1242 included in the pivot assembly 1240, and further to an anchor (e.g., the anchor 190 in FIG. 1A). The pivot assembly 1240 can also include a distance sensor 1246 (e.g., a laser distance sensor). The cable 1202 can loop around the anchor and attach to the cable gripper 1212.

During operation of the apparatus 1200, the motor 1221 can be controlled (e.g., via the controller 130 in FIG. 1A) to rotate gears in the gearbox 1224 at desired rotation rates and/or angles. Rotation of the cable drum 1225 winds or unwinds the cable 1202 onto or from the spiraling groove 1226. The actuator 1227 moves the drum winder 1228, which can ensure that the cable 1202 remains in the spiraling groove 1226 during rotation of the cable drum 1225, reducing the risk of the cable 1202 tangling or causing an uneven rate of winding or unwinding. Winding or unwinding a particular cable 1202 via a corresponding motor 1221 changes the length of the portion of the cable 1202 extending between the body assembly 1210 and a corresponding anchor attached to the surface. Therefore, the motor 1221 can be controlled to shorten the cable 1202 to position the body assembly 1210 closer to the corresponding anchor, or lengthen the cable 1202 to position the body assembly 1210 farther from the corresponding anchor. The distance sensor 1246 can measure the distance to the corresponding anchor in real-time.

The cable gripper 1212 can allow the cable 1202 to exert a downward force (e.g., toward the angled surface), improving the stability of the apparatus 1200 during operation. The downward force applied by the cable 1202 can be greater when the apparatus 1200 is near the anchor around which the cable 1202 is coupled or loops (e.g., when the angle of the portion of the cable extending between the anchor and the cable gripper 1212 is steep). Configuring the cable 1202 to extend from the cable gripper 1212 to an anchor, and back to the apparatus (e.g., to the pivot assembly 1240), however, requires approximately double the cable length compared to when the cable 1202 is configured to extend once between the apparatus and the anchor (e.g., the apparatus 200). Doubling the cable length can also require doubling both the winding rate of the cable drum, which increases energy consumption, and the length of the cable drum, which requires bigger components and adds weight.

Figure 13A:
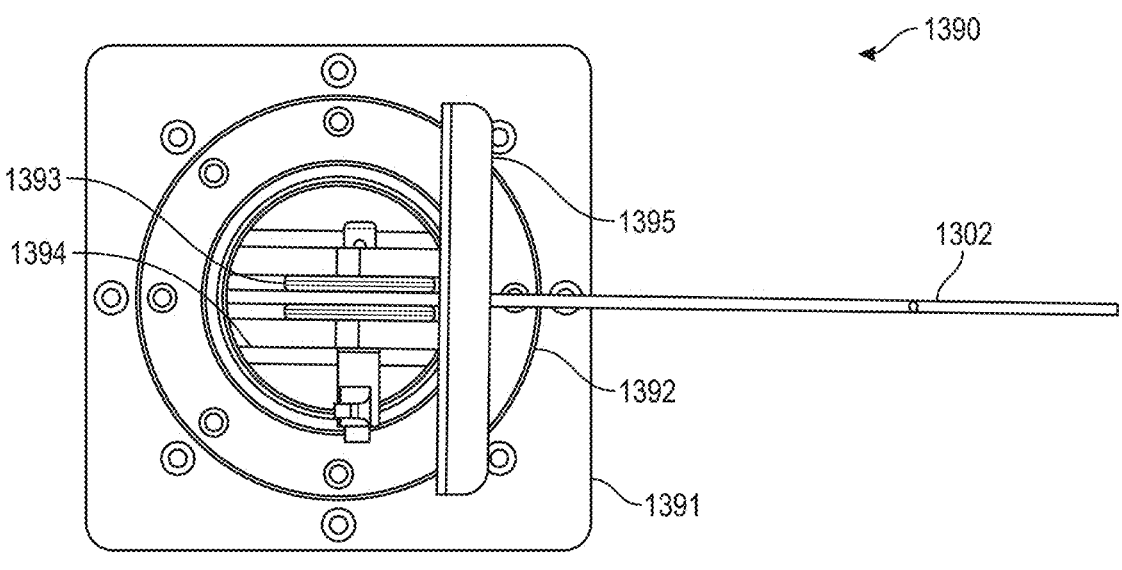
FIGS. 13A and 13B are top-down and side views, respectively, of an anchor, configured in accordance with embodiments of the present technology.
Figure 13B:
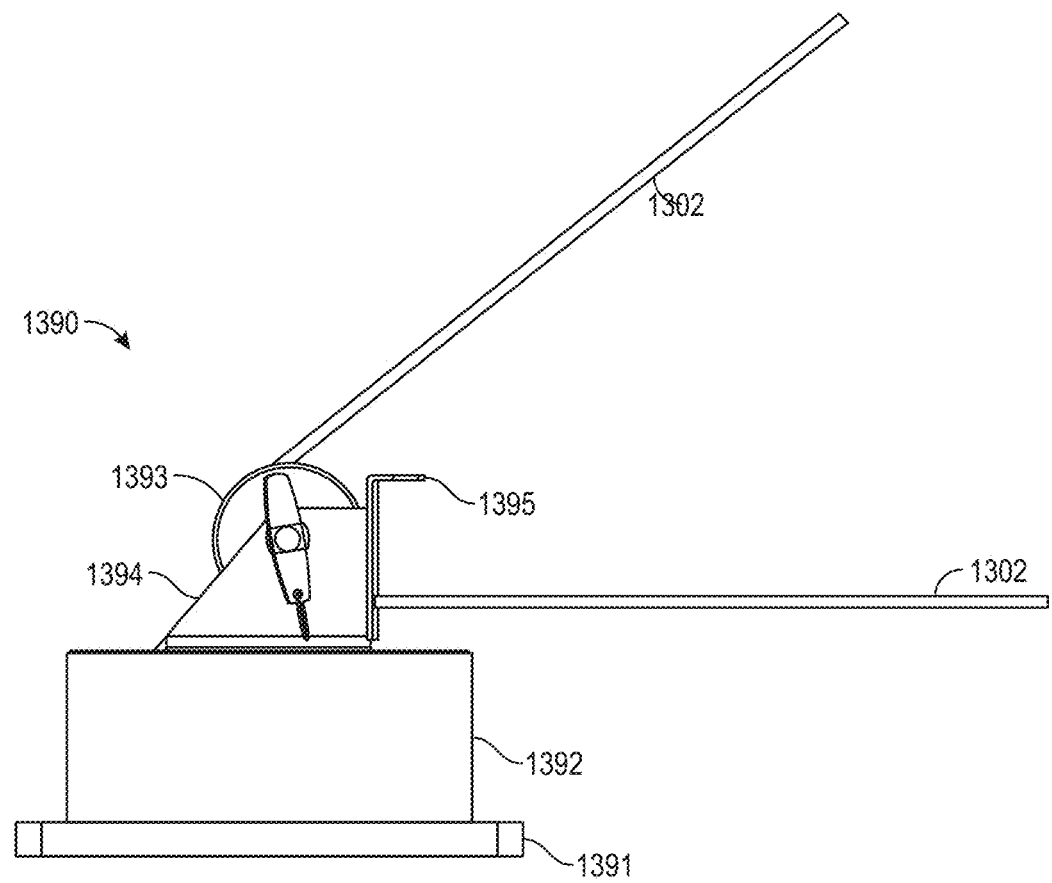

FIGS. 13A and 13B are top-down and side views, respectively, of an anchor 1390 (e.g., the anchor 190 in FIG. 1A), configured in accordance with embodiments of the present technology. Referring to FIGS. 13A and 13B together, the anchor 1390 can include a surface mating portion 1391, a bearing 1392 attached to the surface mating portion 1391, a pulley stand 1394 attached to the bearing 1392, a pulley 1393 mounted on the pulley stand 1394, and a plate 1395 attached to the pulley stand 1394 and/or the bearing 1392. A cable 1302 (e.g., the cable 102 in FIG. 1A) can extend from a component of an apparatus (e.g., the cable gripper 1212 of the apparatus 1200 in FIG. 12), extend around the pulley 1393, and extend back towards another component of the apparatus (e.g., the pivot assembly 1240).

Prior to operation of the apparatus (e.g., the apparatus 1200 in FIG. 12), the surface mating portion 1391 can be attached to a surface (e.g., the angled surface 108), such as via fasteners. During operation of the apparatus, the bearing 1392 enables the pulley 1393, and hence the cable 1302, to freely rotate relative to the surface on which the surface mating portion 1391 attaches to. The pulley stand 1394 and the plate 1395 provide structural support in keeping the pulley 1393 in place while tension in the cable 1302 exerts a force on the pulley 1393.

The horizontal orientation of the positioning assemblies 320 (FIGS. 3-5) and the vertical orientation of the positioning assemblies 1020, 1220 (FIGS. 10 and 12) provide different advantages. For example, orienting cable drums vertically (e.g., as shown via the cable drum 1225) allows the length of the cable drum to be extended without increasing the proportion of the angled surface occupied by the apparatus. A longer cable drum can wind more cable, and an apparatus with a smaller footprint can have greater maneuverability across the angled surface. On the other hand, orienting cable drums horizontally (e.g., the cable drums 425) allows the center of gravity of the apparatus (e.g., the apparatus 200) to be low, reducing the risk that the apparatus tips over during operation. Depending on a desired application and end use of the apparatus, embodiments of the present technology can include positioning assemblies in either the horizontal or vertical orientation.

Figure 14A:
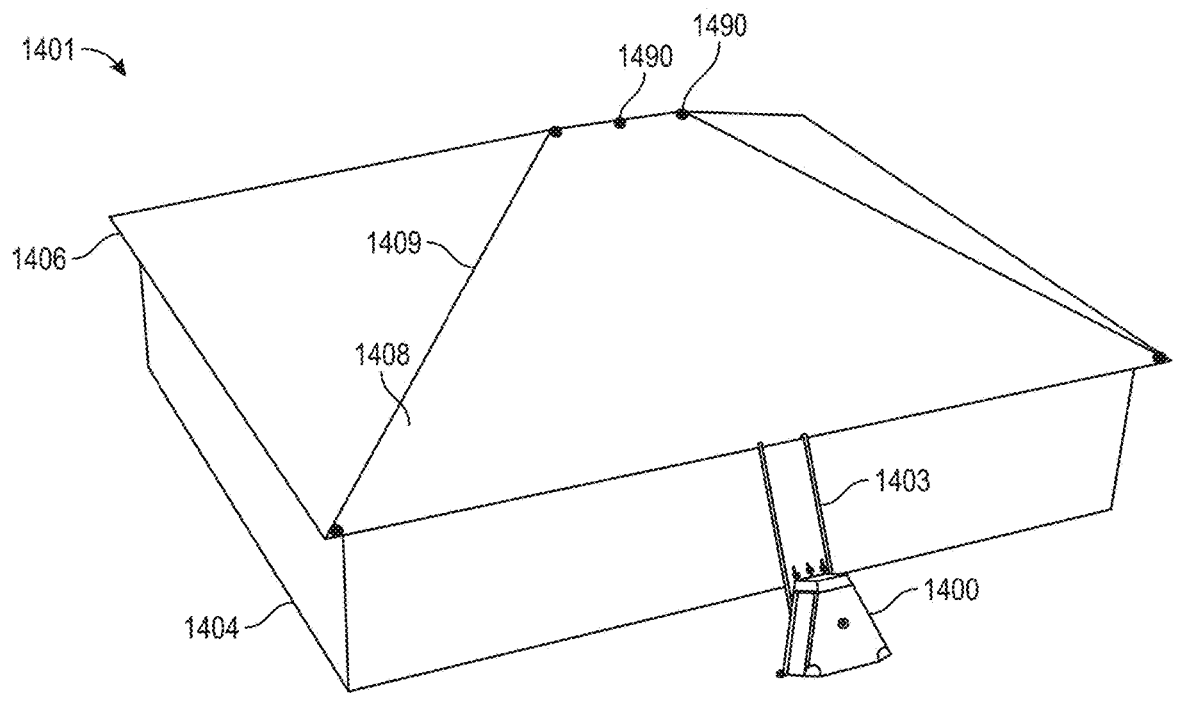
FIGS. 14A and 14B are perspective views of a system for operating an apparatus on an angled surface, configured in accordance with embodiments of the present technology.
Figure 14B:
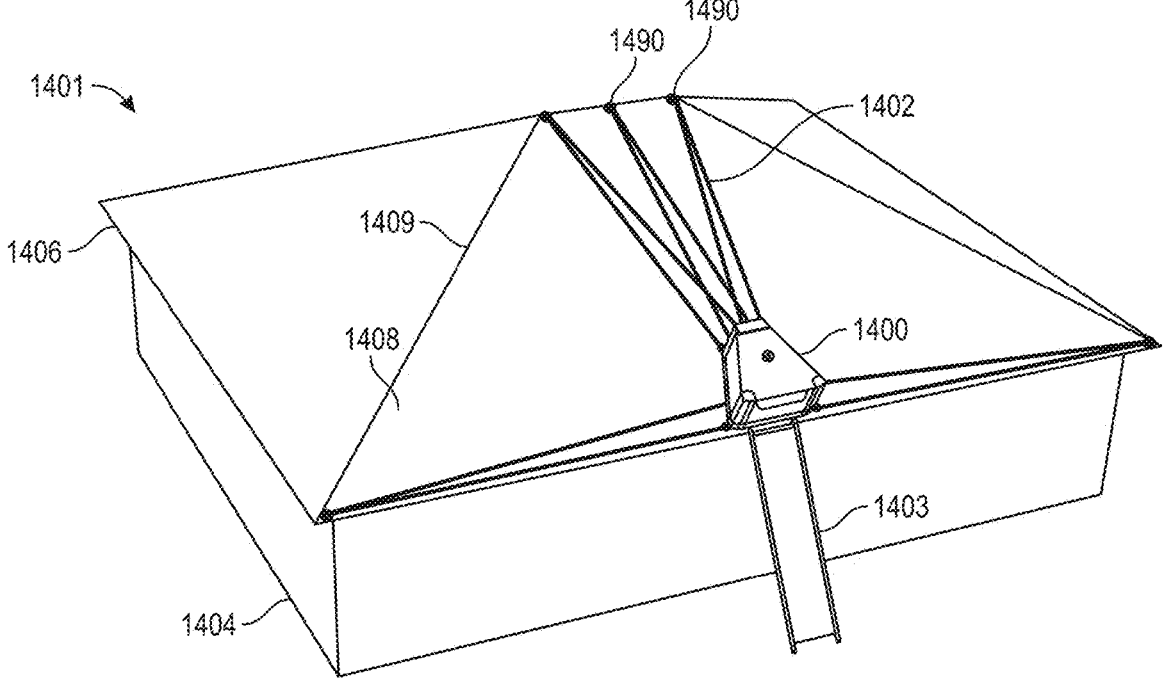

FIGS. 14A and 14B are perspective views of a system 1401 for operating an apparatus 1400 (e.g., the apparatus 100 in FIG. 1A) on an angled surface 1408 (e.g., the angled surface 108), configured in accordance with embodiments of the present technology. The angled surface 1408 can be part of a roof 1406 of a building structure 1404 (e.g., residential, commercial, etc.). In the illustrated embodiment, the system 1401 includes five anchors 1490 (e.g., the anchors 190)

coupled to the roof 1406 (as described herein) and mounted along a periphery 1409 of the angled surface 1408.

Referring to FIGS. 14A and 14B together, the anchors 1490 can be mounted manually or at least partially autonomously by a different device. Afterward, a ramp 1403 can be placed or installed between the ground and an edge of the angled surface 1408 to provide a path from the ground to the angled surface 1408. In some embodiments, the apparatus 1400 can be positioned at a lower portion of the ramp 1403 and raised to the angled surface 1408 manually, autonomously, or via a separate device. The cables 1402 (e.g., the cables 102 in FIG. 1A) (FIG. 14B) can be brought to the angled surface 1408 separately and attached to the apparatus 1400 accordingly. In some embodiments, the apparatus 1400 can be positioned at the lower portion of the ramp 1403 and coupled to one or more of the cables 1402. The apparatus 1400 can then be raised by tensioning the one or more of the cables 1402 such that the apparatus travels via the ramp 1403 to the angled surface 1408.

In some embodiments, the ramp 1403 can comprise a flat structure such that the apparatus 1400 can be pushed or pulled upward. In some embodiments, the ramp 1403 can comprise a motorized belt such that the belt lifts the apparatus 1400 from the ground onto the angled surface 1408. In some embodiments, the ramp 1403 can comprise a solar panel configure to generate power and transfer the generated power to the apparatus 1400 (e.g., via the utility cord 215). In some embodiments, the apparatus 1400 is manually raised to the angled surface 1408 and is then coupled to the cables 1402. In some embodiments, the cables 1402 can be included with the apparatus (e.g., the cables can be wound on a cable drum, such as the cable drum 425 or the cable drum 1245) and pulled out of the apparatus.

III. Methods of Operating an Apparatus to Place Surface Materials on a Surface FIG. 15 is a flowchart illustrating a method 1500 of operating an apparatus (e.g., the apparatus 200, the apparatus 1000) to place surface materials (e.g., the surface material 205) on a surface (e.g., the angled surface 208), configured in accordance with embodiments of the present technology. The method 1500 can include providing a system (e.g., the system 101, the system 201) comprising anchors (e.g., the anchors 190, the anchors 290, the anchors 1390), cables (e.g., the cables 102, the cables 202, the cables 1202) coupled to individual ones of the anchors, and the apparatus coupled to the cables (process portion 1510).

The method 1500 can further include receiving inputs including a geometry of the surface, and one or more dimensions of surface materials (e.g., the surface material 205) to be installed on the surface (process portion 1520). In some embodiments, the surface can comprise a roof surface, a window, or any other part of a structure. The surface can have a shape of a rectangle, a parallelogram, a triangle, or any other shape. In some embodiments, the surface material can comprise a roof shingle, a solar panel, a cleaning product (e.g., a wiping sheet), etc. The one or more dimensions of the surface materials can include lengths, widths, thicknesses, diameters, or other dimensions.

The method 1500 can further include, based on the geometry of the surface and the one or more dimensions of the surface materials, determining an initial position of the apparatus (process portion 1530). The initial position can be at or near an edge of the surface (e.g., the periphery 109, the periphery 209), a corner of the surface, or a center of the surface. In some embodiments, the initial position of the apparatus can be further based on a length and an orientation of an arm assembly (e.g., the arm assembly 160).

The method 1500 can further include, based on the initial position, determining a tension of the individual ones of the cables to move the apparatus to the initial position (process portion 1540). In some embodiments, the lengths and/or tension of individual ones of the cables can be determined via kinematics, as described elsewhere herein (e.g., with respect to FIGS. 25 and 26). In some embodiments, the method 1500 can be implemented by a controller (e.g., the controller 130).

In some embodiments, the method 1500 can further include, based on the geometry of the surface and the one or more dimensions of the surface materials, (i) determining a placement position of one of the surface materials and (ii) determining a viable workspace on the surface for the apparatus. Determining the initial position of the apparatus can comprise determining a plurality of candidate positions around the placement position and selecting a subset of the candidate positions overlapping with the viable workspace on the surface. In some embodiments, the apparatus can further include an arm assembly, and determining the initial position of the apparatus can be based on (i) a length and an orientation of the arm assembly, (ii) minimizing tension in the cables, and/or (iii) minimizing travel distance of the apparatus across the surface.

In some embodiments, the method 1500 can further include, based on the geometry of the surface and the one or more dimensions of the surface materials, determining an initial orientation of the apparatus. Determining the tension of the individual ones of the cables can be further based on the initial orientation of the apparatus. Additionally or alternatively, the method 1500 can further include (i) placing a first surface material and a second surface material on the surface, and (ii) measuring a distance between a first edge of the first surface material and a second edge of the second surface material.

Figures 16A, 16B, 16C:
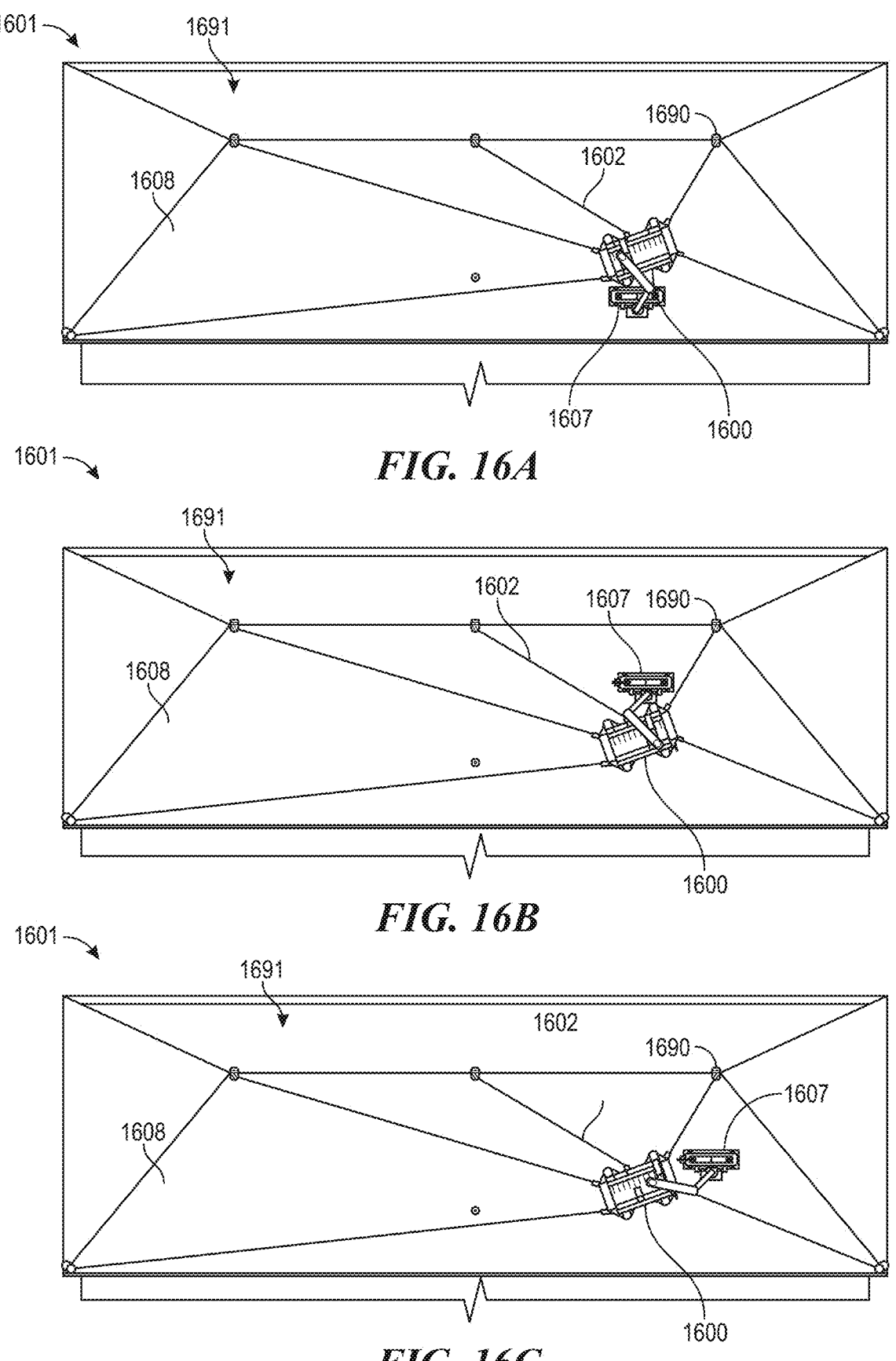
FIGS. 16A-C are top-down views of a system including an apparatus in various configurations on an angled surface, configured in accordance with embodiments of the present technology.

FIGS. 16A-C are top-down views of a system 1601 (e.g., the system 101) including an apparatus 1600 (e.g., the apparatus 100) in various configurations on an angled surface 1608 (e.g., the angled surface 108), configured in accordance with embodiments of the present technology. Referring to FIGS. 16A-C together, the system 1601 can also include an anchoring system 1691 (e.g., the anchoring system 191) comprising a plurality of anchors 1690 (e.g., the anchors 190) positioned at various points on or around the angled surface 1608. The apparatus 1600 can be held in position on the angled surface 1608 via cables 1602 of the anchoring system 1691 providing a particular tension to each of the cables 1602. FIGS. 16A-C show the apparatus 1600 positioned and oriented in the same manner on the angled surface 1608, but with a surface material 1607 held by the apparatus 1600 at various positions relative to the apparatus 1600. For example, FIG. 16A shows the apparatus 1600 carrying the surface material 1607 below the apparatus 1600, FIG. 16B shows the apparatus 1600 carrying the surface material 1607 above the apparatus 1600, and FIG. 16C shows the apparatus 1600 carrying the surface material 1607 at a side of the apparatus 1600. As described herein with respect to various embodiments of the apparatus, a body assembly (e.g., the body assembly 310) of the apparatus can remain in a fixed location while an arm assembly (e.g., the arm assembly 360) moves a material handling assembly (e.g., the material handling assembly 370) around the body assembly in order to, for example, minimize movement or travel of the body assembly while still accessing various locations on the angled surface 1608 for placing the surface material 1607. In doing so, the body assembly can be used to move the apparatus to a general desired area, thus serving as a "coarse" adjustment, and the arm assembly and/or material handle assembly can be used to place the surface material at a specific position of the angled surface, thus serving as a "fine" adjustment.

Figure 17:
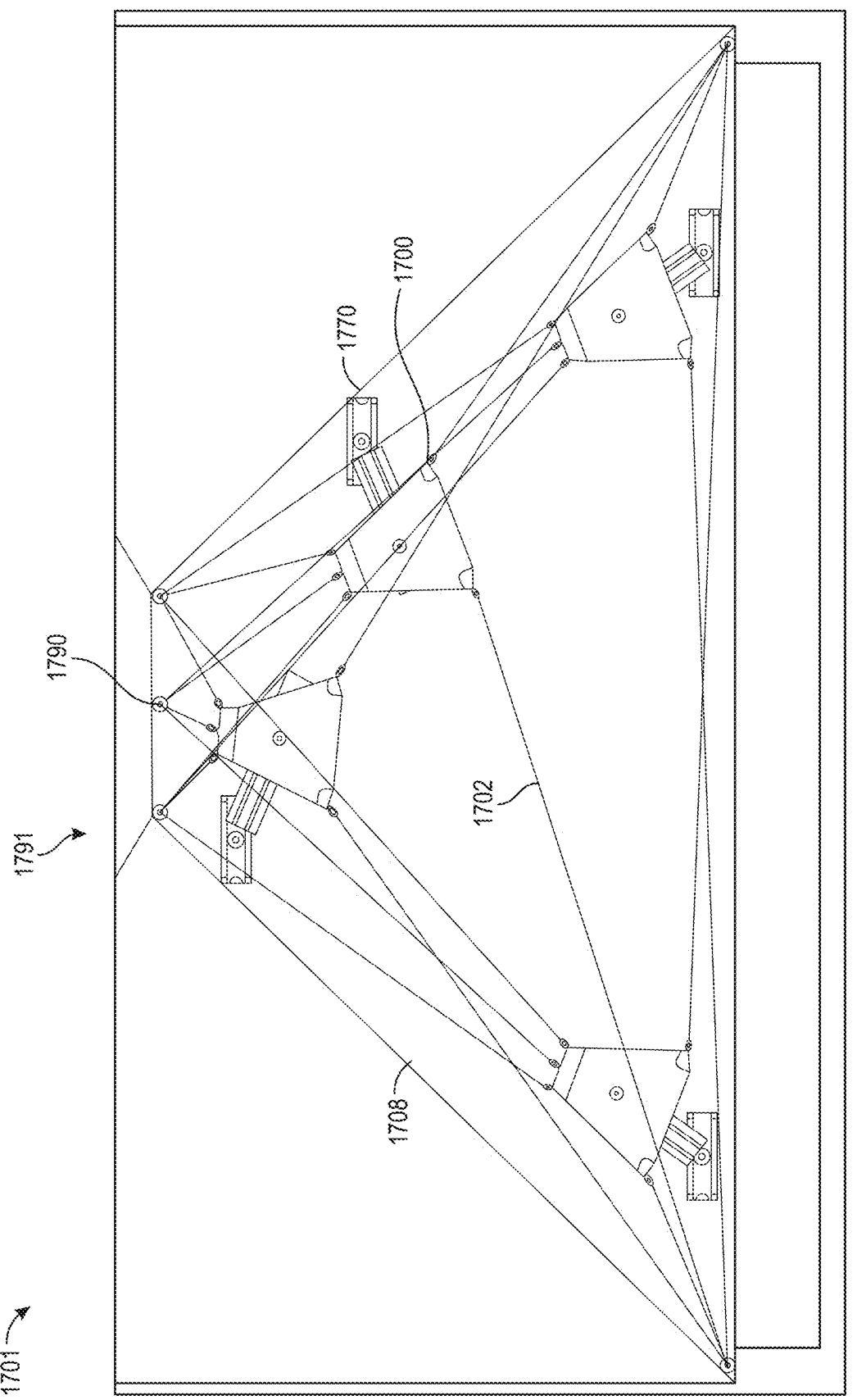
FIG. 17 is a top-down view of a system including an apparatus in various configurations on an angled surface, configured in accordance with embodiments of the present technology.

FIG. 17 is a top-down view of a system 1701 (e.g., the system 101) including an apparatus 1700 (e.g., the apparatus 100) in various configurations on an angled surface 1708 (e.g., the angled surface 108), configured in accordance with embodiments of the present technology. The system 1701 can including an anchoring system 1791 (e.g., the anchoring system 191) comprising a plurality of anchors 1790 (e.g., the anchors 190). As similarly discussed above with respect to FIGS. 16A-C, the apparatus 1700 can be positioned and/or oriented at various positions on the angled surface 1708 while carrying a surface material (obscured from view in FIG. 17) at various positions relative to the apparatus 1700. In the illustrated embodiment, for example, the apparatus 1700 is shown at four different positions (and orientations) with a body assembly positioned at a distance from the edges of the angled surface 1708. An arm assembly and a material handling assembly of the apparatus 1700 is shown carrying and placing the surface material at the edges. As will be described in further detail below, the positions, orientations, and travel path of the apparatus 1700 can be optimized based on certain factors, including to reduce risk of the apparatus 1700 falling over an edge of the angled surface 1708, to minimize total travel path, and/or to minimize tension in cables 1702, etc.

Figure 18:
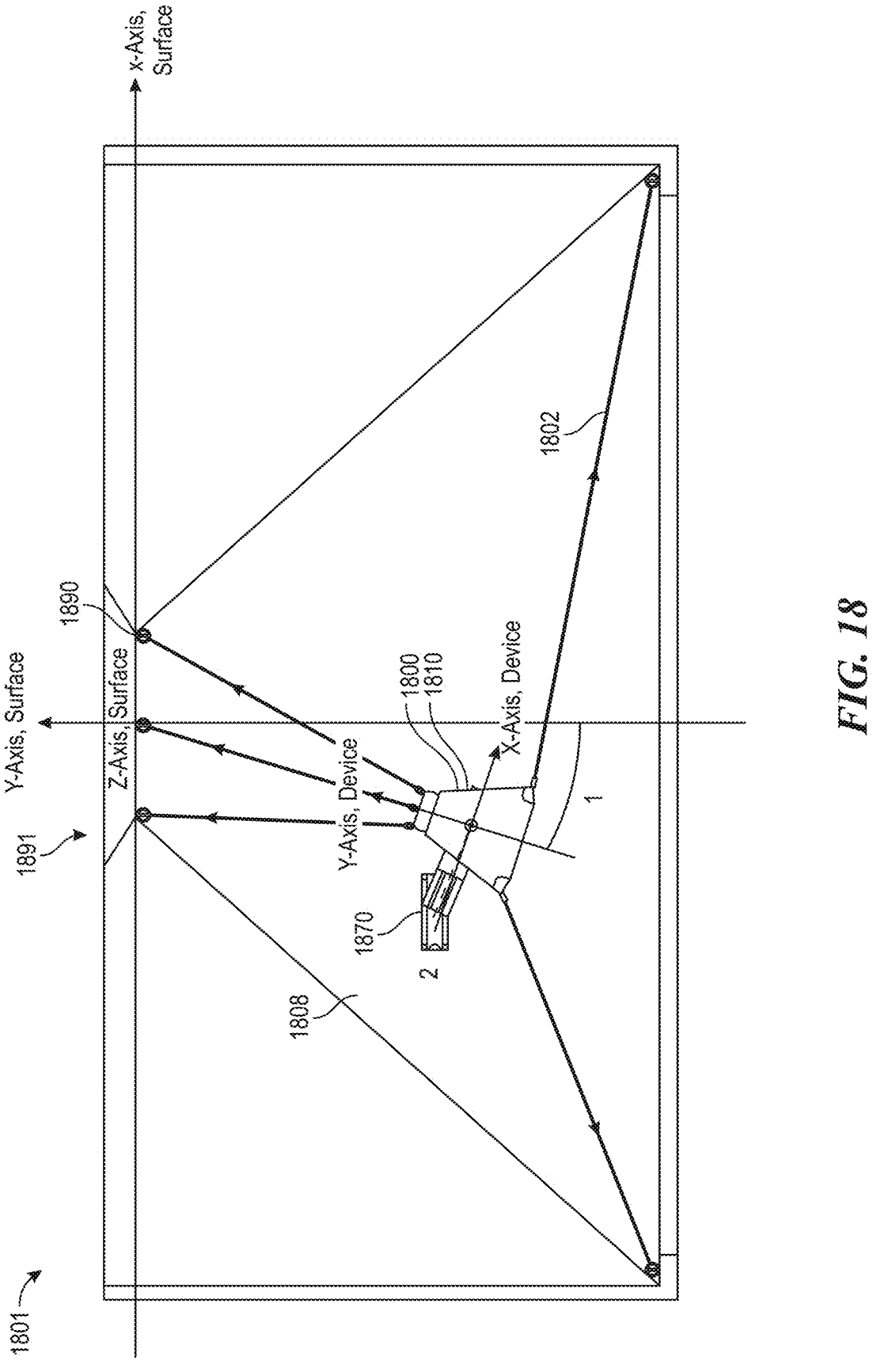
FIG. 18 is a top-down view of a system including an apparatus on an angled surface, configured in accordance with embodiments of the present technology.

FIG. 18 is a top-down view of a system 1801 (e.g., the system 101) including am apparatus 1800 (e.g., the apparatus 100) on an angled surface 1808 (e.g., the angled surface 108), configured in accordance with embodiments of the present technology. A controller (e.g., the controller 130) and/or a computer system can define the angled surface 1808 as a surface coordinate plane formed by x-axis, surface and y-axis, surface. In the illustrated embodiment, the origin of the surface coordinate plane is defined at an edge of the angled surface 1808 and at or proximate to an anchor 1890 (e.g., the anchor 190), and the x- and y-axes are set parallel to one or more edges of the angled surface 1808. In other embodiments, the origin of the surface coordinate plane can be defined elsewhere and/or the x- and y-axes can be set at an angle to one or more edges of the angled surface 1808.

An anchoring system 1891 (e.g., the anchoring system 191) can include a plurality of anchors 1890 (e.g., the anchors 190) and a plurality of cables 1802 (e.g., the plurality of cables 102). A position and orientation of a body assembly 1810 (e.g., the body assembly 110) can be defined relative to the surface coordinate plane (e.g., x-y coordinates and an apparatus angle $\theta 1$ about z-axis, surface). A length and a unique tension vector of each cable 1802 can also be defined relative to the surface coordinate plane. For example, the length of each cable can be measured by a first sensor included in the apparatus 1800 (e.g., the distance sensor 646). The tension vector can be measured by a second sensor (e.g., the force-measuring sensor 432) and a third sensor (e.g., the encoder 645).

A position and orientation of a material handling assembly 1870 (e.g., the material handling assembly 170) can be defined relative to an apparatus coordinate plane defined by an x-axis, device and a y-axis, device (e.g., x-y coordinates and an arm angle $\theta 2$).

Figure 19:
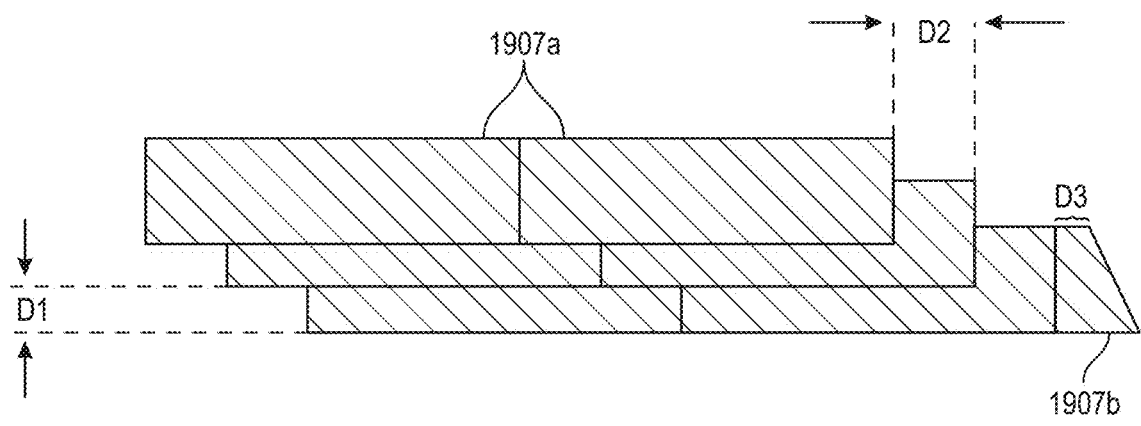
FIG. 19 is a schematic of a shingle layout, configured in accordance with embodiments of the present technology.

FIG. 19 is a schematic of a shingle layout, configured in accordance with embodiments of the present technology. In the illustrated embodiment, six rectangular roof shingles 1907*a* and one edge roof shingle 1907*b* are arranged in three partially overlapping rows. Each row is shown with two rectangular roof shingles arranged side-by-side. The roof shingles can be placed on top of one another such that bottom edges of roof shingles in one row are separated from bottom edges of roof shingles in an adjacent row by a predetermined dimension D1 (e.g., an exposure dimension), and side edges of roof shingles in one row are separated from side edges of roof shingles in an adjacent row by a predetermined dimension D2 (e.g., an offset dimension). Moreover, the edge roof shingle 1907*b* can have a trapezoidal shape and be placed side-by-side with a rectangular roof shingle 1907*a*. One side of the edge roof shingle can have a dimension D3 (e.g., a shingle width dimension). Once the dimensions D1, D2, D3 are measured, they can be compared against predetermined minimum, maximum, or exact values that the shingle layout requires. In some embodiments, the shingles 1907*a*, 1907*b* can have other shapes (e.g., parallelograms, triangles, circles, ovals) and dimensions. The shingle layout as shown and the principles described above can be applied to other surface materials, such as solar panels and cleaning products.

Figure 20A:
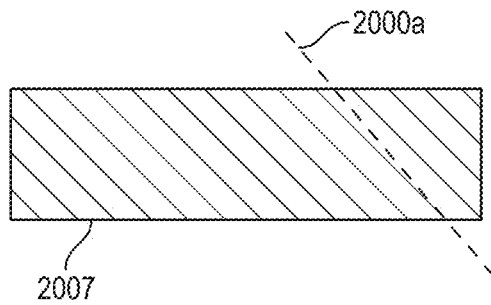
FIGS. 20A and 20B are schematics of a shingle cut for placement on an edge of a surface, configured in accordance with embodiments of the present technology.
Figure 20B:
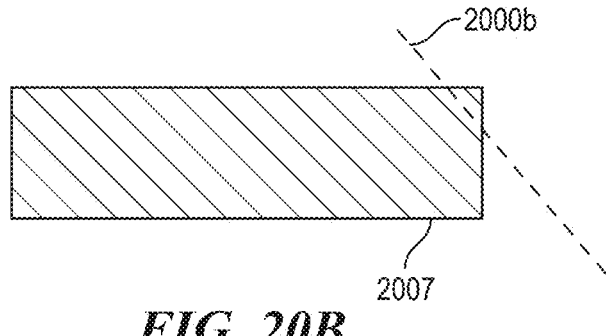

FIGS. 20A and 20B are schematics of a shingle 2007 cut for placement on an edge of a surface, configured in accordance with embodiments of the present technology. The shingle 2007 can be an example of the edge shingle 1907*b* shown in FIG. 19. In FIG. 20A, the shingle 2007 can be cut along line 2000*a* such that the remaining portion (on the left side of the line 2000*a*) has four edges. On the other hand, in FIG. 20B, the shingle 2007 can be cut along line 2000*b* such that the remaining portion (on the left side of the line 2000*a*) has five edges. In some embodiments, a controller (e.g., the controller 130 in FIG. 1A) or a computer system ("controller") can validate only cut shingles that have four edges, as shown in FIG. 20A. In some embodiments, the controller can validate only cut shingles that have five edges. In other embodiments, validation can require a different number of edges, a range of number of edges, or different criteria (e.g., a sufficient surface area, shape, etc.).

Figure 21:
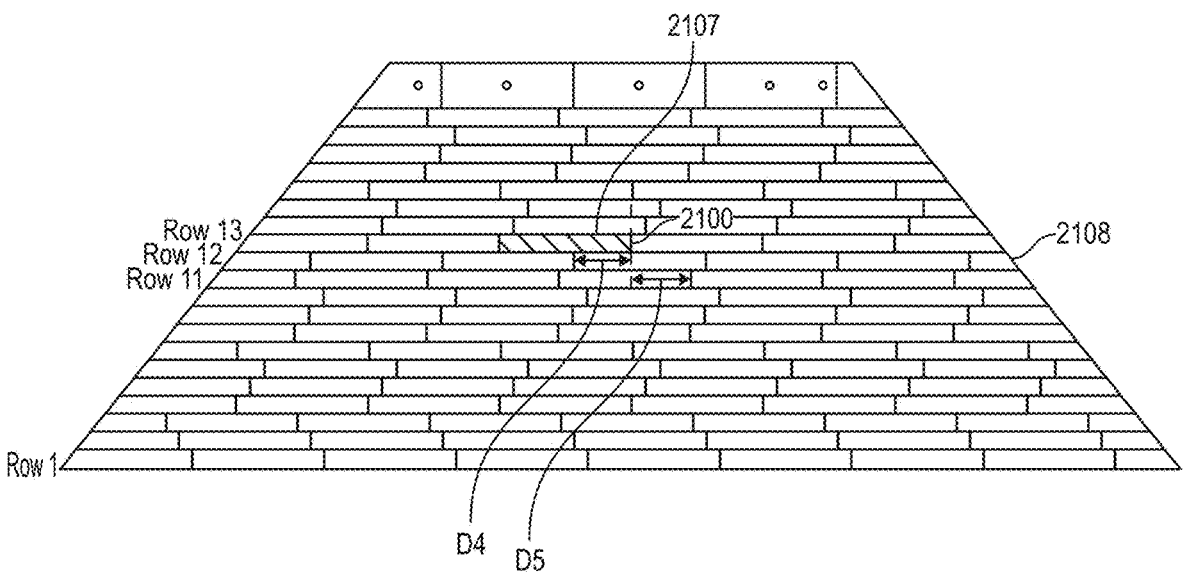
FIG. 21 is a schematic of a shingle layout on a surface, configured in accordance with embodiments of the present technology.

FIG. 21 is a schematic of a shingle layout on a surface, configured in accordance with embodiments of the present technology. A plurality of shingles (or other surface materials) can be arranged in rows on an angled surface 2108 (e.g., the angled surface 108 in FIG. 1A). In the illustrated embodiment, the filled in shingle 2107 in Row 13 represents a shingle currently being placed (e.g., by the apparatus 100). When placing the shingle 2107, a controller (e.g., the controller 130 in FIG. 1A) or a computer system can measure the distance D4 between an edge 2100 of the shingle 2107 (extended across multiple rows as shown by the dotted line) and another shingle in an adjacent row (e.g., in Row 12), and validate that the distance D4 is greater than a first predetermined minimum value for that dimension (FIG. 19). Additionally or alternatively, the controller can measure the distance D5 between an edge 2100 of the shingle 2107 (extended across multiple rows as shown by the dotted line) and another shingle two rows away (e.g., in Row 11), and validate that the distance D5 is greater than a second predetermined minimum value for that dimension.

The various dimensions and validation criteria discussed above with respect to FIGS. 19-21 can be measured by one or more sensors (e.g., the sensors 773, the sensors 1173) of an apparatus (e.g., the apparatus 100), e.g., while the apparatus is placing surface materials on a surface. If a measured dimension is greater than a predetermined maximum dimension, less than a predetermined minimum dimension, outside a predetermined range, or otherwise fails a validation criterion, the apparatus can move the surface material to a different position and/or orientation, e.g., until all validation criteria are met. In some embodiments, the apparatus may reject a given surface material entirely and discard it or store it for future disposal.

Figure 22:
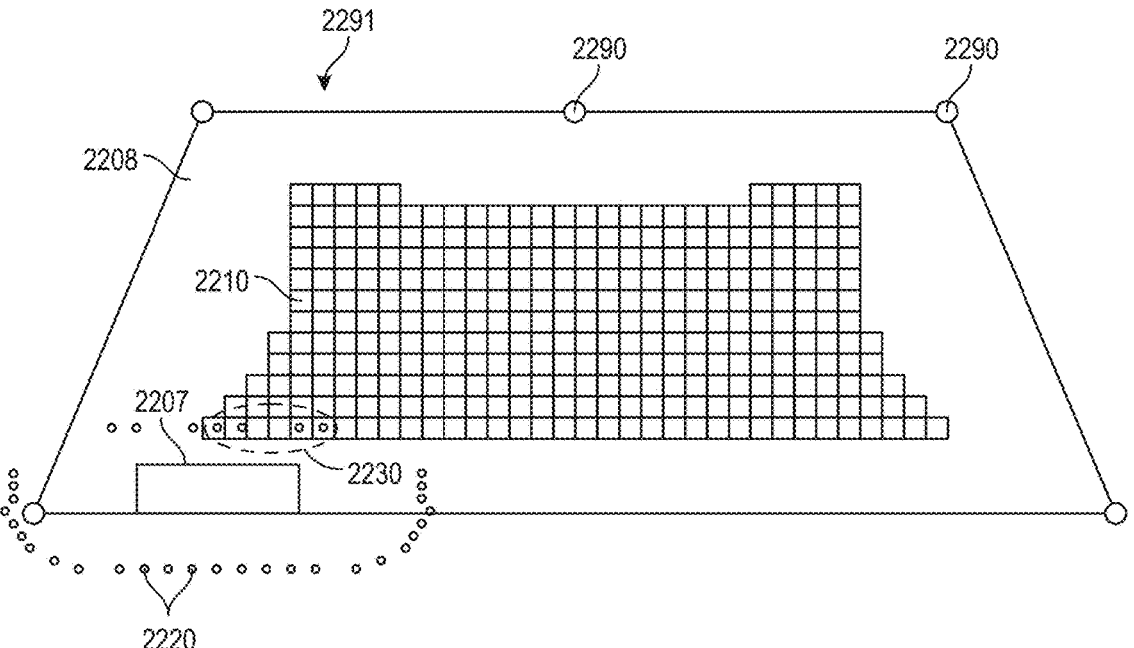
FIG. 22 is a schematic illustrating positioning and orienting an apparatus on a surface, configured in accordance with embodiments of the present technology.

FIG. 22 is a schematic illustrating positioning and orienting an apparatus (e.g., the apparatus 100) on a surface 2208 (e.g., the angled surface 108), configured in accordance with embodiments of the present technology. An anchoring system 2291 (e.g., the anchoring system 191) can include a plurality of anchors 2290 (e.g., the anchors 190) attached to various positions on or proximate to the surface 2208.

Based on inputs such as the geometry of the surface 2208 and dimensions of the apparatus, a controller (e.g., the controller 130 in FIG. 1A) or a computer system can determine a viable workspace 2210 on the surface 2208. The viable workspace 2210 can represent the region within which a body assembly (e.g., the body assembly 110) of the apparatus can safely operate without falling off the surface 2208, causing undue tension in any cables (e.g., the cables 102), or causing excessive stress on components of the apparatus or the anchors 2290. For example, the viable workspace 2210 can be a region spaced apart from the edges of the surface 2208, as shown.

Afterward, the controller can determine a site at which to place a surface material 2205 (e.g., the surface material 205), such as via the principles discussed above. The controller can then determine a plurality of candidate positions or regions 2220 for the body assembly of the apparatus to be at in order for a material handling assembly (e.g., the material handling assembly 170) attached to the body assembly via an arm assembly (e.g., the arm assembly 160) to reach the placement site of the surface material 2205. In the illustrated embodiment, the candidate positions 2220 are distributed around the surface material 2205 at a relatively constant distance. The controller can then choose a subset 2230 of the candidate positions 2220 that overlap with the viable workspace 2210. In some embodiments, the controller can evaluate individual ones of the subset 2230 for potential issues, such as risk of collision between one or more components of the apparatus and the surface material 2205, between different components of the apparatus (e.g., a collision between the body assembly and the material handling assembly), and/or between the surface material 2205 and cables. The controller can then pick one or more positions among the subset 2230 that are determined to be issue/collision-free. Finally, the controller can choose a specific position that achieves certain goals, such as minimizing the total travel distance of the body assembly, reducing tension in the cables, reducing stress on the components of the apparatus, and/or finding the most centered position.

Figures 23A, 23B, 23C:
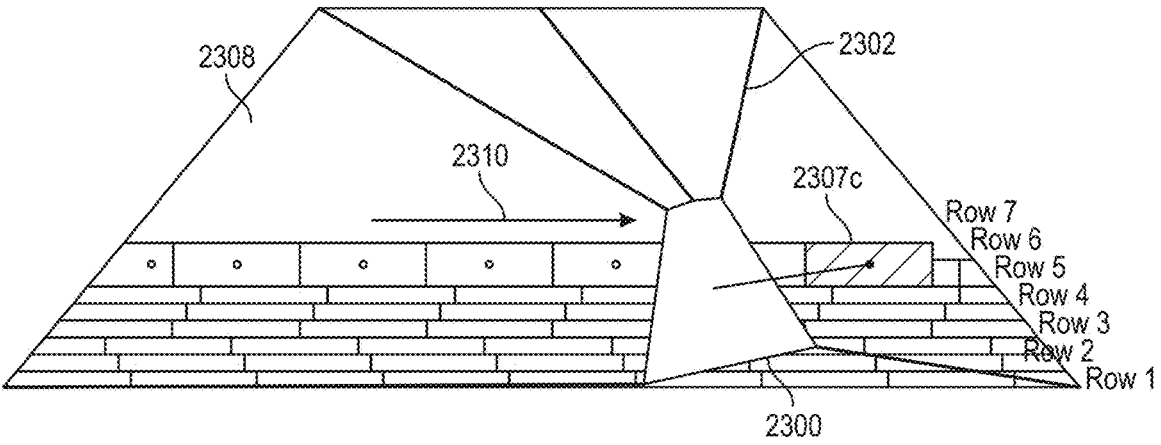
FIGS. 23A-C are schematics illustrating an apparatus placing surface materials on a surface, configured in accordance with embodiments of the present technology.

FIGS. 23A-C are schematics illustrating an apparatus 2300 (e.g., the apparatus 100) placing surface materials 2307*a*, 2307*b*, 2307*c* on a surface 2308 (e.g., the angled surface 208), configured in accordance with embodiments of the present technology. Referring first to FIG. 23A, the apparatus 2300 is shown placing surface material 2307*a* in Row 4 of a layout on the surface 2308. While the apparatus 2300 can remain stationery while placing the first surface material 2307*a*, the apparatus 2300 can be moved in direction 2310 (e.g., by controlling the lengths and tension of cables 2302) to place the next surface materials in Row 4. In some embodiments, the apparatus 2300 can remain in a viable workspace (e.g., the viable workspace 2210 of FIG. 22) during operation. Referring next to FIG. 23B, the apparatus 2300 is shown placing surface material 2307*b* in a final position of Row 4, after which the travel direction 2310 can reverse and the apparatus 2300 can continue placing surface materials in Row 5, Row 6, and so forth. As shown, the surface material can be in a different position relative to the apparatus 2300 for different surface materials. Referring finally to FIG. 23C, the apparatus 2300 is shown placing surface material 2307*c* in Row 7. The apparatus 2300 can continue to move across the surface 2308 until all surface materials are placed and the layout is complete.

In the illustrated embodiment, the apparatus 2300 moves in a back-and-forth path such that the apparatus 2300 moves leftward when placing surface materials 2307 in an even-numbered row and rightward when placing surface materials 2307 in an odd-numbered row. In some embodiments, the travel path can be hardcoded or otherwise predetermined. In some embodiments, the travel path can change, evolve, and/or be optimized during operation as machine vision gathers new information, such as by graph searching for a surface material placement order including estimated material reload times and positions.

Figure 24A:
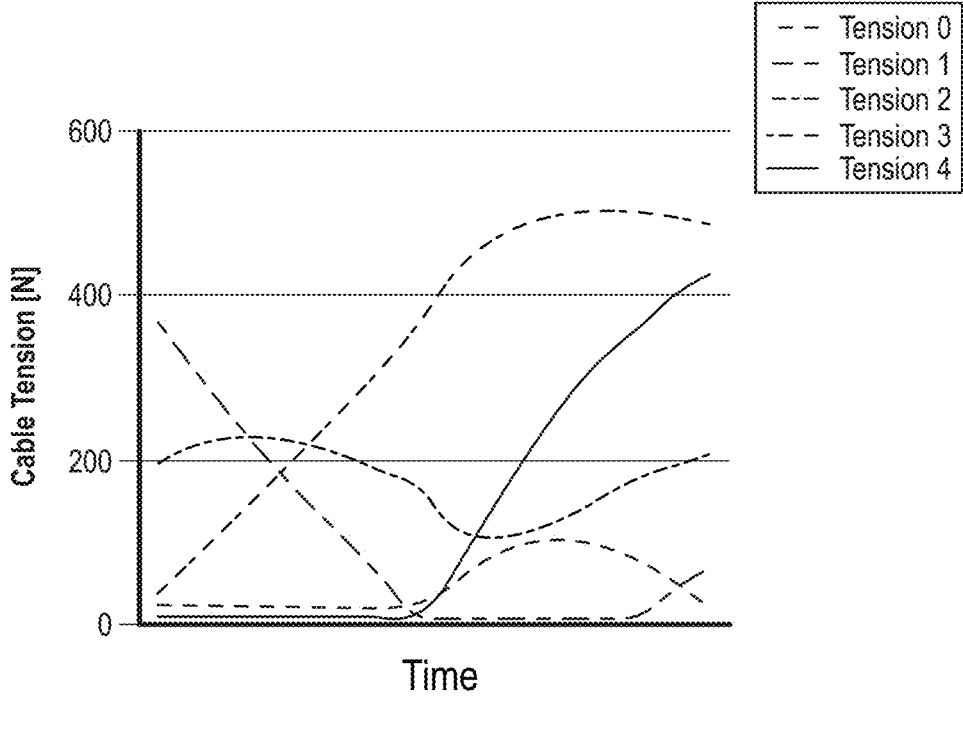
FIGS. 24A and 24B are graphs illustrating example tensions and lengths of cables used to position and orient an apparatus on a surface, configured in accordance with embodiments of the present technology.
Figure 24B:
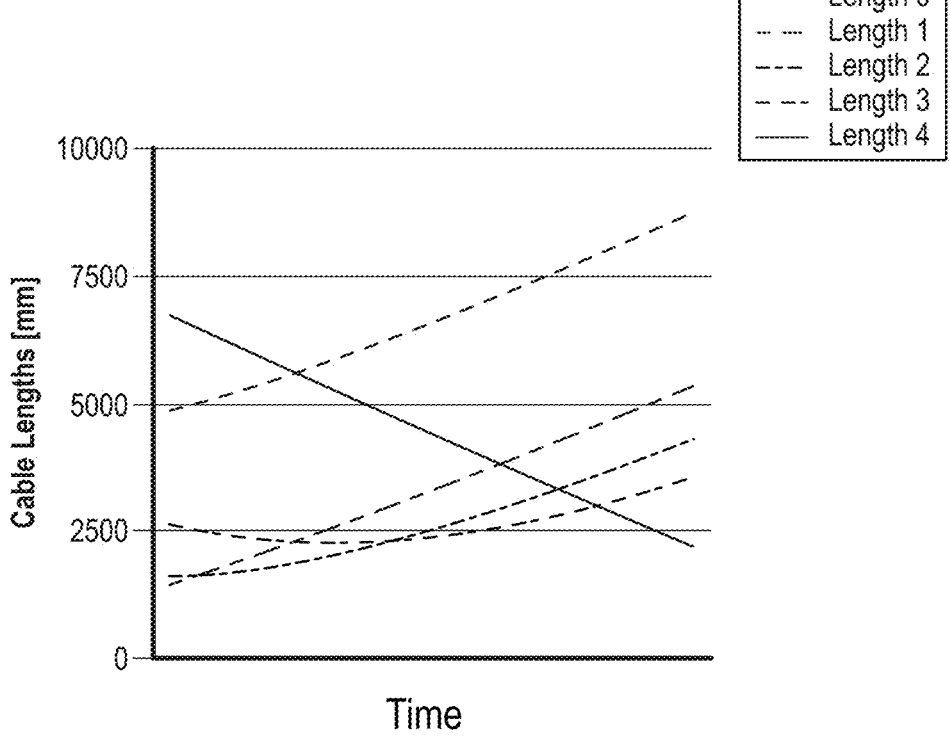

FIGS. 24A and 24B are graphs illustrating example tension and lengths, respectively, of cables (e.g., the cables 102) used to position and orient an apparatus (e.g., the apparatus 100) on an angled surface (e.g., the angled surface 108) over time, configured in accordance with embodiments of the present technology. In some embodiments, the cable tension values shown in FIG. 24A can be measured by a set of sensors (e.g., the force-measuring sensor 432) and the cable lengths shown in FIG. 24B can be measured by another set of sensors (e.g., the distance sensor 646). As shown in the graphs, the tension and lengths of the cables can vary over time as the apparatus is re-positioned and/or re-oriented on the surface in order to place surface materials at various positions on the surface. In some embodiments, the cable tension and lengths change non-linearly when the apparatus is moved in a straight line across the angled surface.

Figures 25, 26:
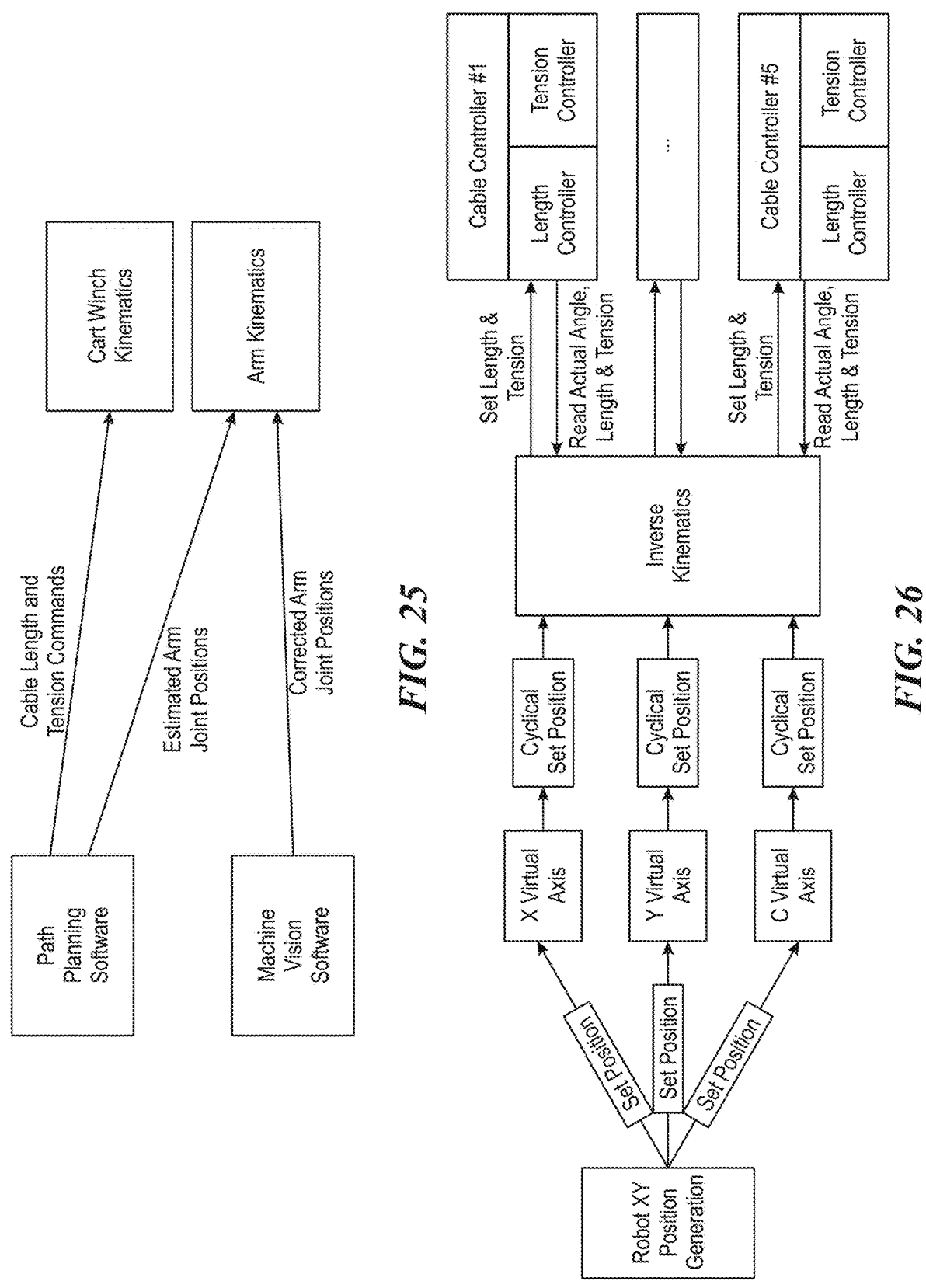
FIG. 25 is a diagram illustrating a method of placing surface materials on a surface, configured in accordance with embodiments of the present technology.
FIG. 26 is a diagram illustrating a method of moving an apparatus across a surface, configured in accordance with embodiments of the present technology.

FIG. 25 is a diagram illustrating a method of placing surface materials on a surface, configured in accordance with embodiments of the present technology. In some embodiments, the illustrated method can be implemented by a controller (e.g., the controller 130) or on a computer system. For example, a path planning software can be used to determine a travel path of a body assembly (e.g., the body assembly 110) of the apparatus across the surface. The path planning software can calculate and send cable length and tension control commands to positioning assemblies (e.g., the positioning assemblies 320) of the body assembly, e.g., based on cart or apparatus winch kinematics. The cart winch kinematics can be used as a coarse positioning system for positioning a surface material by first positioning the body assembly. The path planning software can also calculate and send estimated arm joint positions to an arm assembly (e.g., the arm assembly 160) attached to the body assembly based on arm kinematics. The estimated arm joint positions can include positions and/or orientations of, for example, the sliding portion 362, the first bearing 363, the first arm portion 364, the second bearing 365, the second arm portion 366, the third bearing 367, and/or the linear actuator 368 (obscured from view) discussed above with respect to FIG. 3.

In some embodiments, the path planning software uses a numerical optimizer to determine the appropriate tension in each of the cables (e.g., the cables 102). The tension in each cable can be determined such that the sum of external forces and the sum of moments acting on the body assembly are each equal to zero. The cable tensions can also be subject to a predetermined or calculated range such that the tension in each cable is always above a prescribed minimum value (e.g., a minimum tension value to allow the cable to exert a force on the apparatus) and always below a prescribed maximum value (e.g., a maximum tension value to avoid mechanical failure of the apparatus, cables, anchors, etc.). The external forces can include static forces such as the gravitational force, the normal force exerted by the angled surface, the tension applied by the cables, and the weight of the arm assembly and/or the material handling assembly applied to the body assembly. The external forces can also include dynamic forces such as the force the arm assembly exerts on the body assembly as the arm assembly moves the material handling assembly during operation.

The numerical optimizer can also be configured to operate based on an optimization function, including minimizing the average tension value in the cables, minimizing the greatest tension value amongst the cables, and/or minimizing the standard deviations between the tension values in the cables. In some embodiments, the numerical optimizer can be configured to operate based on a combination of multiple optimization functions with different optimization functions assigned a weight.

In some embodiments, the different positioning assemblies can be controlled via different optimization functions or algorithms. For example, three out of five positioning assemblies can be configured to control and optimize the length and/or tension of the corresponding cables while the remaining two positioning assemblies can be configured to control and optimize only the tension in the corresponding cables. In another example, a first subset of the positioning assemblies can be configured to control the position of the apparatus while a second subset of the positioning assemblies (possibly overlapping with the first subset) can be configured to control the orientation of the apparatus. In some embodiments, the positioning assemblies can be controlled via the same optimization function, such as controlling and optimizing both length and tension in the corresponding cables, but with length control given more weight than tension control, or vice versa.

Additionally, machine vision software can calculate and send corrected arm joint positions to the arm assembly based on arm kinematics to supplement or override the estimated arm joint positions sent by the path planning software. Machine vision can be implemented via sensors (e.g., sensors 773) on a material handling assembly (e.g., the material handling assembly 170) of the apparatus and/or other sensors in order to detect real-time positions and orientations of surface materials relative to the surface and/or other objects (e.g., surface materials already placed). The material handling assembly can be attached to the arm assembly, so the arm kinematics can be used as a precise positioning system for positioning the surface material.

FIG. 26 is a diagram illustrating a method of moving an apparatus (e.g., the apparatus 100) across a surface (e.g., the angled surface 108), configured in accordance with embodiments of the present technology. In some embodiments, the illustrated method can be an example of the path planning software described above with respect to FIG. 25. In some embodiments, the illustrated method can be implemented by a controller (e.g., the controller 130) or on a computer system. In some embodiments, the method can include providing or obtaining inputs such as the geometry of the angled surface and/or the positions of the anchors on the angled surface to the path planning software. The method can include discretizing the angled surface into a grid of shapes (e.g., squares, triangles, rectangles) (e.g., as shown in FIG. 22) and using a heuristic to assign a "C" value to each shape in the grid. The "C" values can form a continuous function across the angled surface. The method can then include determining the appropriate cable lengths and tension vectors for each X, Y, C coordinate and/or orientation on the angled surface based on an X virtual axis and a Y virtual axis of the angled surface, and a C virtual axis formed by the "C" values assigned. In some embodiments, the method can run a numerical optimizer (e.g., the numerical optimizer described above with respect to FIG. 25) to determine the appropriate lengths and/or tension vectors for each position and orientation. For example, the path planning software can generate a cable length and tension map accordingly and share the map with the controller.

Once a path for a body assembly (e.g., the body assembly 110) of the apparatus to travel is determined, the body assembly can be assigned a specific coordinate position defined by the X virtual axis, the Y virtual axis, and the C virtual axis. In some embodiments, the coordinate position can be defined relative to the surface coordinate plane described above with respect to FIG. 18. The coordinates can then be used as inputs to, for example, an inverse kinematics algorithm, and the controller(s) (e.g., the controller 130) can in turn can calculate computed length and tension values for each cable for setting corresponding position assemblies (e.g., the positioning assemblies 320). In some embodiments, motors (e.g., the motor 421, the motor 1221) can be controlled to adjust the length and/or tension in the cables to match the computed values respectively. Various sensors included in the apparatus (e.g., the distance sensor 646, the force-measuring sensor 432, the encoder 645) can then measure the actual real-time lengths, tension, and/or angles of individual ones of the cables and communicate the measurements to the inverse kinematics algorithm. In some embodiments, the two-way communication between the inverse kinematics algorithm and the cable controllers comprises a feedback loop in which the algorithm and the cable controllers continuously adjust and correct the lengths and tension of each cable to achieve the desired position of the body assembly at any given moment. In some embodiments, the controller can use linear interpolation on the tension values to move the body assembly.

IV. Computer System

Figure 27:
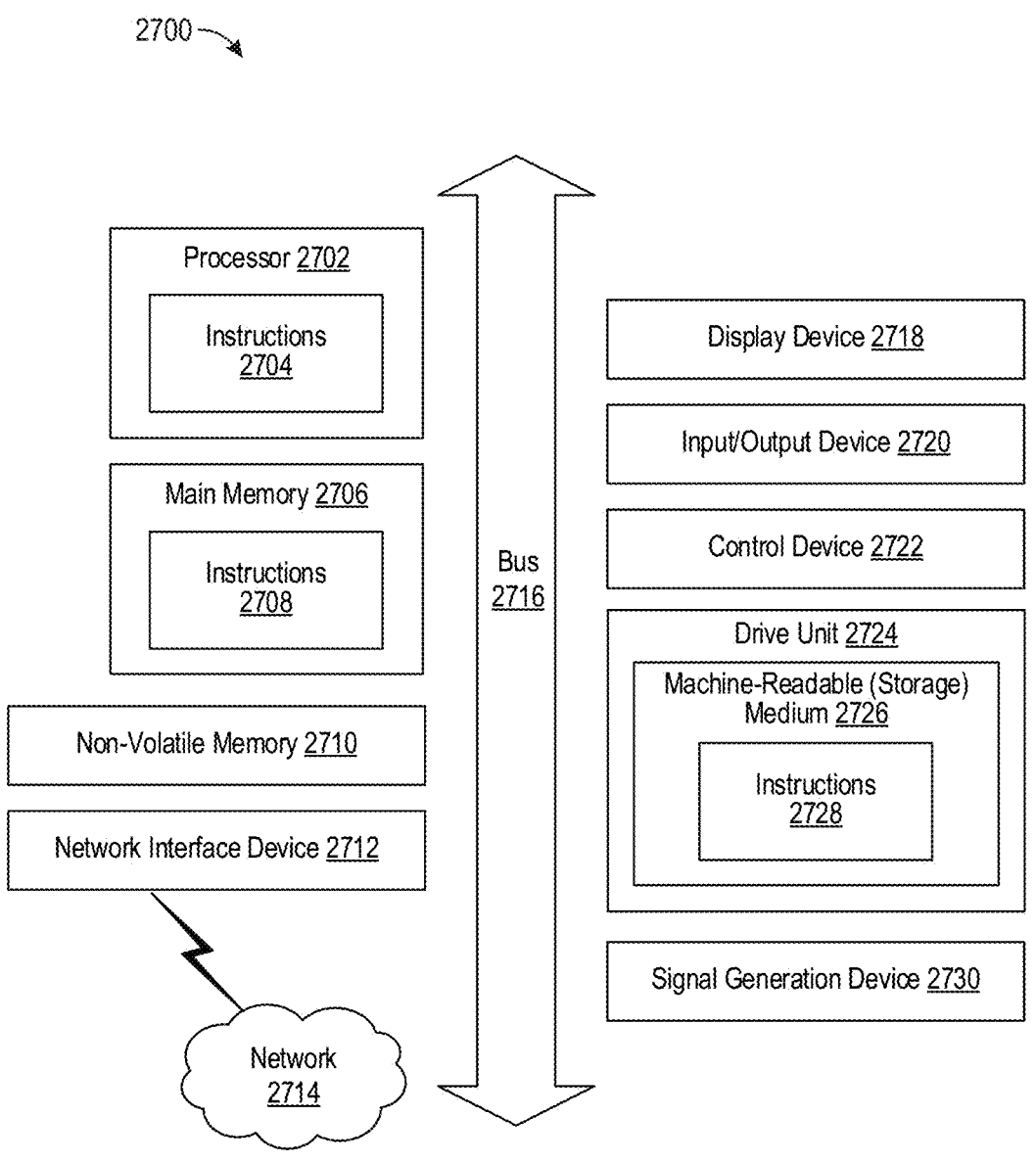
FIG. 27 is a block diagram that illustrates an example of a computer system in which at least some operations described herein can be implemented.

FIG. 27 is a block diagram that illustrates an example of a computer system 2700 in which at least some operations described herein can be implemented. As shown, the computer system 2700 can include: one or more processors 2702, main memory 2706, non-volatile memory 2710, a network interface device 2712, video display device 2718, an input/output device 2720, a control device 2722 (e.g., keyboard and pointing device), a drive unit 2724 that includes a storage medium 2726, and a signal generation device 2730 that are communicatively connected to a bus 2716. The bus 2716 represents one or more physical buses and/or point-to-point connections that are connected by appropriate bridges, adapters, or controllers. Various common components (e.g., cache memory) are omitted from FIG. 27 for brevity. Instead, the computer system 2700 is intended to illustrate a hardware device on which components illustrated or described relative to the examples of the figures and any other components described in this specification can be implemented.

The computer system 2700 can take any suitable physical form. For example, the computing system 2700 shares a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 2700. In some implementation, the computer system 2700 can be an embedded computer system, a system-on-chip (SOC), a single-board computer system (SBC) or a distributed system such as a mesh of computer systems or include one or more cloud components in one or more networks. Where appropriate, one or more computer systems 2700 can perform operations in real-time, near real-time, or in batch mode.

The network interface device 2712 enables the computing system 2700 to mediate data in a network 2714 with an entity that is external to the computing system 2700 through any communication protocol supported by the computing system 2700 and the external entity. Examples of the network interface device 2712 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 2706, non-volatile memory 2710, machine-readable medium 2726) can be local, remote, or distributed. Although shown as a single medium, the machine-readable medium 2726 can include multiple media (e.g., a centralized/distributed database and/or associated caches and servers) that store one or more sets of instructions 2728. The machine-readable (storage) medium 2726 can include any medium that is capable of storing, encoding, or carrying a set of instructions for execution by the computing system 2700. The machine-readable medium 2726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 2710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 2704, 2708, 2728) set at various times in various memory and storage devices in computing device(s). When read and executed by the processor 2702, the instruction(s) cause the computing system 2700 to perform operations to execute elements involving the various aspects of the disclosure.

V. Conclusion

It will be apparent to those having skill in the art that changes may be made to the details of the above-described embodiments without departing from the underlying principles of the present disclosure. In some cases, well known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms "a," "an," and "the" include plural referents unless the context clearly indicates otherwise. Additionally, the term "comprising," "including," and "having" should be interpreted to mean including at least the recited feature(s) such that any greater number of the same feature and/or additional types of other features are not precluded.

Reference herein to "one embodiment," "an embodiment," "some embodiments" or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless otherwise indicated, all numerical parameters set forth in the following specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of "1 to 10" includes any and all subranges between (and including) the minimum value of 1 and the maximum value of 10, i.e., any and all subranges having a minimum value of equal to or greater than 1 and a maximum value of equal to or less than 10, e.g., 5.5 to 10.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

The present technology is illustrated, for example, according to various aspects described below as numbered clauses (1, 2, 3, etc.) for convenience. These are provided as examples and do not limit the present technology. It is noted that any of the dependent clauses may be combined in any combination, and placed into a respective independent clause. The other clauses can be presented in a similar manner.

1. An apparatus configured to operate on an angled surface relative to a direction of gravity, comprising:
   a body assembly including a body frame and a plurality of positioning assemblies coupled to the body frame, wherein the positioning assemblies are configured to position and/or orient the body frame on the surface;
   an arm assembly including a proximal end portion and a distal end portion opposite the proximal end portion, wherein the arm assembly is rotatably coupled to the body portion; and
   a material handling assembly coupled to the distal end portion of the arm assembly, wherein the material handling assembly is configured to carry a surface material.

2. The apparatus of any one of the clauses herein, wherein the body frame includes (i) a first axis extending along a vertical dimension of the body frame and (ii) a second axis normal to the first axis and extending along a length dimension of the body frame, and wherein:
   the arm assembly is rotatably coupled to the body frame about the first axis, and
   the arm assembly is movable, relative to the body frame, along the second axis.

3. The apparatus of any one of the clauses herein, wherein the body frame includes a third axis normal to the second axis and extending along a width dimension of the body frame, and wherein the arm assembly is extendable along the third axis.

4. The apparatus of any one of the clauses herein, wherein the material handling assembly is rotatably coupled to the distal end portion of the arm assembly, and at least a portion of the material handling assembly is moveable, relative to the arm assembly, in a direction toward and away from the distal end portion of the arm assembly.

5. The apparatus of any one of the clauses herein, wherein the positioning assemblies are configured to rotate the body frame across a range of at least 300 degrees.

6. The apparatus of any one of the clauses herein, wherein individual ones of the positioning assemblies are at peripheral portions of the body frame and comprise:
   a winch assembly coupled to the body frame, the winch assembly comprising:
   a drum coupled to the body frame and configured to receive a cable; and
   a drum winder coupled to the body frame and configured to wind and unwind the cable from the drum.

7. The apparatus of any one of the clauses herein, wherein the drum extends along a drum axis, and wherein the winch assembly further comprises:
   an actuator coupled to the body frame and extending along an actuator axis, wherein the drum winder is coupled to the actuator; and
   a motor coupled to the body frame and configured to rotate the drum about the drum axis and actuate the actuator such that the drum winder moves along the actuator axis.

8. The apparatus of any one of the clauses herein, wherein individual ones of the positioning assemblies comprise a cable pivot assembly including:
   a bearing rotatably coupled to the body frame, wherein the bearing is configured to rotate about a pivot axis;
   a pulley coupled to the bearing;

a distance sensor coupled to the pulley; and an encoder coupled to the bearing and configured to measure a rotation angle of the bearing relative to the body frame.

9. The apparatus of any one of the clauses herein, wherein individual ones of the positioning assemblies further comprises:

a pulley coupled to the body frame and configured to receive a cable; and a sensor coupled to the pulley and configured to measure tension in the cable.

10. The apparatus of any one of the clauses herein, wherein the positioning assemblies comprises at least four positioning assemblies each configured to be coupled to a cable.

11. The apparatus of any one of the clauses herein, wherein the arm assembly comprises: a first actuator coupled to the body frame extending along a first axis;

a first arm portion with a first end portion rotatably coupled to the first linear actuator;

a second arm portion with a first end portion rotatably coupled to a second end portion of the first arm portion; and a second actuator rotatably coupled to a second end portion of the second arm portion and extending along a second axis, wherein the second axis is generally perpendicular to the first axis, wherein the material handling assembly is coupled to the second linear actuator.

12. The apparatus of any one of the clauses herein, wherein the arm assembly comprises:

a first telescoping arm portion rotatably coupled to the body frame, wherein the first telescoping arm portion is configured to rotate about a first axis, wherein the first telescoping arm portion is configured to extend along a second axis generally perpendicular to the first axis;

a second telescoping arm portion coupled to a distal end portion of the first telescoping arm portion, wherein the second telescoping arm portion is configured to extend along a third axis generally perpendicular to the second axis; and an attachment portion rotatably coupled to the second telescoping arm portion, wherein the attachment portion is configured to rotate about the third axis, wherein the material handling assembly is coupled to the attachment portion.

13. The apparatus of any one of the clauses herein, wherein the material handling assembly comprises:

a material handling frame coupled to the distal end portion of the arm assembly; and a plurality of handling members coupled to the material handling frame, wherein, in operation, individual ones of the handling members are in an on state or an off state, such that the individual ones of the handling members attach to the surface management material when in the on state, and the individual ones of the handling members do not attach to the surface material when in the off state.

14. The apparatus of any one of the clauses herein, wherein individual ones of the handling members comprise a suction cup.

15. The apparatus of any one of the clauses herein, wherein the material handling assembly further comprises:

a fixation device coupled to the material handling frame, wherein the applicator device comprises at least one of a motorized nail gun, a motorized staple fun, an adhesive applicator, and a heating element, wherein the applicator is configured to attach the surface material to the surface;

an imaging device coupled to the material handling frame; and a processor operatively coupled to the imaging device, wherein the imaging device and the processor are configured to determine an edge of the surface and/or an edge of the surface material, and wherein the arm assembly is configured to be adjusted based on a determination by the processor.

16. The apparatus of any one of the clauses herein, wherein the material handling assembly comprises:

a material handling frame coupled to the distal end portion of the arm assembly; and a fixation device coupled to the material handling frame, wherein the fixation device is configured to fix the surface material onto the angled surface.

17. The apparatus of any one of the clauses herein, wherein the surface comprises a rooftop, and wherein the surface material comprises a roof shingle.

18. The apparatus of any one of the clauses herein, wherein individual ones of the positioning assemblies are coupleable to individual ones of a plurality of cables extending from individual ones of a plurality of anchors attached to the angled surface, and wherein the body assembly further includes at least one of:

a plurality of tension sensors configured to measure tension in corresponding ones of the cables;

a plurality of length sensors configured to measure lengths of corresponding ones of the cables between corresponding ones of the anchors and the body assembly; or a plurality of encoders configured to measure angles of corresponding ones of the cables relative to the body assembly.

19. The apparatus of any one of the clauses herein, wherein the body assembly further includes a hopper configured to receive the surface material.

20 The apparatus of any one of the clauses herein, wherein the body assembly further includes a plurality of wheels configured to contact the surface, wherein the wheels are configured to facilitate movement of the body assembly as the positioning assemblies position and/or orient the body frame on the surface.

21. A system for operating a device on an angled surface, the system comprising:

an apparatus configured to operate over an angled surface and carry one or more surface materials, wherein the angled surface includes an x-axis, a y-axis normal to the x-axis, and a z-axis normal to an x-y plane defined by the x-axis and the y-axis, the apparatus comprising a body frame and a plurality of positioning assemblies at peripheral portions of the body frame;

an anchoring system comprising:

a plurality of anchors attached at a periphery of the angled surface; and a plurality of cables, wherein individual ones of the cables are coupleable to and configured to extend between one of the anchors and one of the positioning assemblies of the surface management apparatus; and a controller operably coupled the positioning assemblies, wherein the controller is configured to affect tension of individual cables by operating the positioning assemblies, and wherein the tension of the individual cables cause the apparatus to be positioned along the x-y plane and orient the apparatus about the z-axis.

22. The system of any one of the clauses herein, wherein:

the angled surface is a roof including an angle relative to a direction of gravity of 5-45 degrees, the positioning assemblies include a first positioning assembly, a second positioning assembly, and a third positioning assembly, the anchors includes a first anchor at a first corner portion of the roof, a second anchor at a second corner portion of the roof, and a third anchor at a third corner portion of the roof, and the cables include a first cable coupled to and extending between the first positioning assembly and the first anchor, a second cable coupled to and extending between the second positioning assembly and the second anchor, and a third cable coupled to and extending between the third positioning assembly and the third anchor, wherein the first cable, the second cable, and the third cable each have a unique tension.

23. The system of any one of the clauses herein, wherein the apparatus further comprises:

a plurality of tension sensors configured to measure tension in corresponding ones of the cables;

a plurality of length sensors configured to measure length of corresponding ones of the cables between corresponding ones of the anchors and the body assembly; and a plurality of encoders configured to measure angles of corresponding ones of the cables along the x-y plane, wherein the tension sensors, the length sensors, and the encoders are configured to output measured data to the controller, and wherein the controller is configured to operate the individual ones of the tensioner devices based on the measured data.

24. The system of any one of the clauses herein, wherein individual ones of the positioning assemblies comprise:

a distance sensor attached to a corresponding one of the cables, wherein the distance sensor is configured to measure a distance between the distance sensor and a corresponding one of the anchors to which the one of the cables extends; and an encoder configured to measure a rotation angle of the bearing relative to the body frame.

25. The system of any one of the clauses herein, further comprising a sensor on the apparatus and positioned to measure a displacement on the surface and/or a distance between adjacent ones of the surface materials.

26. The system of any one of the clauses herein, wherein individual ones of the anchors comprises:

a bushing comprising a first cavity and a second cavity;

a biasing member positioned in the first cavity; and a rod having a first end portion positioned in the first cavity and a second end portion positioned in the second cavity, wherein the first end portion is configured to compress the biasing member, and wherein the second end portion is configured to attached to a corresponding one of the cables.

27. The system of any one of the clauses herein, wherein the apparatus comprises five positioning assemblies, and wherein the anchoring system comprises five anchors and five cables.

28. A method of operating an apparatus to place surface materials on a surface, the method comprising:

providing a system comprising:

anchors attached to a surface, cables coupled to individual ones of the anchors, and an apparatus including positioning assemblies coupled to individual ones of the cables, receiving inputs including:

a geometry of the surface, and one or more dimensions of surface materials to be installed on the surface;

based on the geometry of the surface and the one or more dimensions of the surface materials, determining an initial position of the apparatus; and based on the initial position, determining a tension of the individual ones of the cables to move the apparatus to the initial position.

29 The method of any one of the clauses herein, further comprising:

based on the geometry of the surface and the one or more dimensions of the surface materials, determining a placement position of one of the surface materials; and based on the geometry of the surface and the one or more dimensions of the surface materials, determining a viable workspace on the surface for the apparatus, wherein determining the initial position of the apparatus comprises determining a plurality of candidate positions around the placement position and selecting a subset of the candidate positions overlapping with the viable workspace on the surface.

30. The method of any one of the clauses herein, wherein the apparatus further includes an arm assembly, and wherein determining the initial position of the apparatus is based on a length and an orientation of the arm assembly.

31. The method of any one of the clauses herein, wherein determining the initial position of the apparatus is based on minimizing tension in the cables.

32. The method of any one of the clauses herein, wherein determining the initial position of the apparatus is based on minimizing travel distance of the apparatus across the surface.

33 The method of any one of the clauses herein, further comprising:

based on the geometry of the surface and the one or more dimensions of the surface materials, determining an initial orientation of the apparatus, wherein determining the tension of the individual ones of the cables is further based on the initial orientation of the apparatus.

34 The method of any one of the clauses herein, further comprising:

validating that one of the surface materials comprises four edges.

35. The method of any one of the clauses herein, further comprising:

placing a first surface material and a second surface material on the surface; and measuring a distance between a first edge of the first surface material and a second edge of the second surface material.

36. The method of any one of the clauses herein, wherein the geometry of the surface comprises a parallelogram, a trapezoid, or a non-rectangular shape.

37. The method of any one of the clauses herein, wherein the system further comprises a sensor on the apparatus, and wherein measuring the distance comprises measuring the distance via the sensor.

38. The method of any one of the clauses herein, wherein the surface materials are configured to be attached to a roof, and wherein one of the surface materials comprises a first dimension of at least 5 inches and a second dimension of at least 10 inches.

39. An anchor fixedly attached to an angled surface and configured to be coupled to a cable, the anchor comprising:

a base member configured to be fixedly attach to one or more angled surfaces;

a bearing member attached to the base member and;

a bushing attached to the bearing member and comprising a cavity; and a rod member at least partially disposed within the cavity, wherein the rod member is configured to be attached to a cable.

40. The anchor of the previous clause, further comprising a biasing member at least partially disposed within the cavity, wherein the biasing member is configured to be compressed by the rod member due to tension in the cable pulling on the rod member.

41. The anchor of any one of the clauses herein, wherein the bushing further comprises a ring portion defining an end of the cavity, wherein the rod member comprises an end cap at a distal end portion of the rod member, and wherein the anchor further comprises:

a biasing member at least partially disposed within the cavity, wherein the biasing member is configured to be compressed between the ring portion and the end cap of the rod member due to tension in the cable pulling on the rod member.

42. The anchor of any one of the clauses herein, wherein the one or more angled surfaces includes a first surface and a second surface oriented at a non-zero angle relative to the first surface, and wherein the base member is a first base member fixedly attached to the first surface, the anchor further comprising:

a second base member fixedly attached to the second surface and rotatably coupled to the first base member via a hinge.

43. The anchor of any one of the clauses herein, wherein the rod member is configured to be attached to the cable via cable splicing.

44. The anchor of any one of the clauses herein, further comprising a reflector plate attached to the bearing member and/or the bushing.

We claim:

1. A method of operating an apparatus to place surface materials on an angled surface, the method comprising:

providing a system comprising:

a first anchor attached to a first position of an angled surface, a second anchor attached to a second position of the angled surface, the second position being different than the first position, a first cable coupled to the first anchor, a second cable coupled to the second anchor, and an apparatus coupled to each of the first cable and the second cable, wherein the first cable forms a first angle relative to an axis of the angled surface and the second cable forms a second angle relative to the axis, the first angle being different than the second angle, receiving inputs including:

a geometry of the angled surface, and one or more dimensions of surface materials to be installed on the angled surface;

based on the geometry of the angled surface and the one or more dimensions of the surface materials, determining an initial position of the apparatus; and based on the initial position, determining a tension of at least one of the first cable or the second cable to move the apparatus to the initial position.

2. The method of claim 1, further comprising:

based on the geometry of the angled surface and the one or more dimensions of the surface materials, determining a placement position of one of the surface materials; and based on the geometry of the angled surface and the one or more dimensions of the surface materials, determining a viable workspace on the angled surface for the apparatus, wherein determining the initial position of the apparatus comprises determining a plurality of candidate positions around the placement position and selecting a subset of the candidate positions overlapping with the viable workspace on the angled surface.

3. The method of claim 1, wherein the apparatus further includes an arm assembly, and wherein determining the initial position of the apparatus is based on a length and an orientation of the arm assembly.

4. The method of claim 1, wherein determining the initial position of the apparatus is based on minimizing tension in the first and second cables.

5. The method of claim 1, wherein determining the initial position of the apparatus is based on minimizing travel distance of the apparatus across the angled surface.

6. The method of claim 1, further comprising, based on the geometry of the angled surface and the one or more dimensions of the surface materials, determining an initial orientation of the apparatus, wherein determining the tension of the at least one of the first cable or the second cable is further based on the initial orientation of the apparatus.

7. The method of claim 1, further comprising:

placing a first surface material and a second surface material on the angled surface; and measuring a distance between a first edge of the first surface material and a second edge of the second surface material.

8. The method of claim 7, wherein the system further comprises a sensor on the apparatus, and wherein measuring the distance comprises measuring the distance via the sensor.

9. The method of claim 1, wherein the geometry of the angled surface comprises a parallelogram, a trapezoid, or a non-rectangular shape.

10. The method of claim 1, wherein the surface materials are configured to be attached to a roof, and wherein one of the surface materials comprises a first dimension of at least 5 inches and a second dimension of at least 10 inches.

11. A method of operating an apparatus on an angled surface, the method comprising:

providing a system comprising:

a first anchor attached to an angled surface at a first fixed position, a second anchor attached to the angled surface at a second fixed position spaced apart from the second fixed position, a third anchor attached to the angle surface at a third fixed position, a first cable coupled to the first anchor, a second cable coupled to the second anchor, and an apparatus coupled to each of the first cable and the second cable, receiving inputs including a geometry of the angled surface; and based on the geometry of the angled surface, tensioning at least one of the first cable or the second cable to move the apparatus along the angled surface.

12. The method of claim 11, wherein tensioning comprises tensioning the first cable and the second cable in a coordinated manner to move the apparatus.

13. The method of claim 11, wherein the first and second anchors are attached to the angled surface such that, as the apparatus moves along the angled surface, the first and second cables are configured to extend between corresponding ones of the first and second anchors and the apparatus at acute or obtuse angles relative to one another.

14. The method of claim 11, wherein each of the first and second cables extends in a straight line directly between a corresponding one of the first and second anchors and the apparatus.

15. The method of claim 11, wherein the system further comprises:

a fourth anchor attached to the angled surface at a fourth fixed position, a fifth anchor attached to the angled surface at a fifth fixed position.

16. The method of claim 11, wherein the inputs further include one or more dimensions of surface materials to be installed on the angled surface, and wherein the method further comprises operating the apparatus to place the surface materials on the angled surface based on the one or more dimensions of the surface materials.

17. The method of claim 11, wherein the inputs further include one or more dimensions of surface materials to be installed on the angled surface, and wherein the method further comprises:

based on the geometry of the angled surface and the one or more dimensions of the surface materials, determining an initial position of the apparatus;

based on the geometry of the angled surface and the one or more dimensions of the surface materials, determining a placement position of one of the surface materials; and based on the geometry of the angled surface and the one or more dimensions of the surface materials, determining a viable workspace on the angled surface for the apparatus, wherein determining the initial position of the apparatus comprises determining a plurality of candidate positions around the placement position and selecting a subset of the candidate positions overlapping with the viable workspace on the angled surface.

18. The method of claim 11, further comprising determining an initial position of the apparatus on the angled surface based on minimizing tension in the first and second cables.

19. The method of claim 11, further comprising determining an initial position of the apparatus on the angled surface based on minimizing travel distance of the apparatus along the surface.

20. A method of operating an apparatus on an angled surface, the method comprising:

receiving a first input including a geometry of an angled surface, wherein the angled surface extends along an x-axis and a y-axis perpendicular to the x-axis;

receiving a second input including one or more dimensions of surface materials to be installed on the angled surface;

determining, based on at least one of the geometry of the angled surface and the one or more dimensions of the surface materials, a first position and a second position of an apparatus on the angled surface, wherein the first position and the second position are located at different points along each of the x-axis and the y-axis; and tensioning a plurality of cables coupled to the apparatus to move the apparatus from the first position to the second position along a carved path.

21. The method of claim 20, wherein tensioning the plurality of cables comprises moving the apparatus from the first position to a second position along a straight line.

22. A method of operating an apparatus on an angled surface, the method comprising:

receiving a first input including a geometry of an angled surface, wherein the angled surface extends along an x-axis and a y-axis perpendicular to the x-axis;

receiving a second input including one or more dimensions of surface materials to be installed on the angled surface;

determining, based on at least one of the geometry of the angled surface and the one or more dimensions of the surface materials, a first position and a second position of an apparatus on the angled surface, wherein the first position and the second position are located at different points along each of the x-axis and the y-axis;

tensioning a plurality of cables coupled to the apparatus to move the apparatus from the first position to the second position along a curved path;

determining, based on the geometry of the angled surface and the one or more dimensions of the surface materials, a rotation angle of the apparatus; and tensioning the plurality of cables to rotate the apparatus by the rotation angle about a z-axis perpendicular to each of the x-axis and the y-axis.

* * * * *